US012495356B2

(12) United States Patent
Sedin et al.

(10) Patent No.: US 12,495,356 B2
(45) Date of Patent: Dec. 9, 2025

(54) RANDOM ACCESS IN NETWORK SUPPORTING UEs WITH DIFFERENT PRE-COMPENSATION AND/OR GNSS CAPABILITIES

(71) Applicant: Telefonaktiebolaget LM Ericsson (publ), Stockholm (SE)

(72) Inventors: Jonas Sedin, Sollentuna (SE); Talha Khan, Santa Clara, CA (US); Xingqin Lin, San Jose, CA (US); Helka-Liina Määttänen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 17/635,597

(22) PCT Filed: Aug. 12, 2020

(86) PCT No.: PCT/IB2020/057598
§ 371 (c)(1),
(2) Date: Feb. 15, 2022

(87) PCT Pub. No.: WO2021/028850
PCT Pub. Date: Feb. 18, 2021

(65) Prior Publication Data
US 2022/0295572 A1  Sep. 15, 2022

Related U.S. Application Data

(60) Provisional application No. 62/891,783, filed on Aug. 26, 2019, provisional application No. 62/887,412, filed on Aug. 15, 2019.

(51) Int. Cl.
H04W 74/0833 (2024.01)
H04W 48/18 (2009.01)
(Continued)

(52) U.S. Cl.
CPC ....... *H04W 48/18* (2013.01); *H04W 72/0453* (2013.01); *H04W 72/51* (2023.01);
(Continued)

(58) Field of Classification Search
CPC . H04W 74/0833; H04W 36/08; H04W 48/18; H04W 72/0453; H04W 72/51;
(Continued)

(56) References Cited

U.S. PATENT DOCUMENTS

2008/0167029 A1  7/2008  Lindoff et al.
2013/0109392 A1  5/2013  Chun et al.
(Continued)

FOREIGN PATENT DOCUMENTS

CN  108243391 A  7/2018
WO  2018082529 A1  5/2018
(Continued)

OTHER PUBLICATIONS

Examination Report for Indian Patent Application No. 202247012709, mailed Jul. 19, 2022, 5 pages.
(Continued)

*Primary Examiner* — Yu-Wen Chang
(74) *Attorney, Agent, or Firm* — Withrow & Terranova, PLLC

(57) ABSTRACT

Systems and methods for supporting random access for wireless devices have different levels of random access pre-compensation and/or Global Navigation Satellite System (GNSS) capabilities are disclosed. In one embodiment, a method performed by a wireless device comprises obtaining two or more random access configurations for two or more wireless device classes that support different levels of pre-compensation for random access, have different GNSS capabilities, or both. The method further comprises selecting a random access configuration to be used by the wireless (Continued)

device from the two or more random access configurations. In this manner, random access is tailored to the capabilities of the wireless device.

24 Claims, 12 Drawing Sheets

(51) Int. Cl.
| | |
|---|---|
| H04W 72/0453 | (2023.01) |
| H04W 72/51 | (2023.01) |
| H04W 74/08 | (2009.01) |
| H04W 74/0838 | (2024.01) |

(52) U.S. Cl.
CPC ... *H04W 74/0833* (2013.01); *H04W 74/0841* (2013.01); *H04W 74/0866* (2013.01); *H04W 74/0838* (2024.01)

(58) Field of Classification Search
CPC ......... H04W 74/0841; H04W 74/0866; H04W 56/0045; H04W 74/004; H04W 74/006; H04B 7/18504
See application file for complete search history.

(56) References Cited

U.S. PATENT DOCUMENTS

| | | | |
|---|---|---|---|
| 2015/0133151 A1 | 5/2015 | Jung et al. | |
| 2017/0013644 A1 | 1/2017 | Zhu et al. | |
| 2017/0127332 A1 | 5/2017 | Axmon et al. | |
| 2017/0215119 A1 | 7/2017 | Hong et al. | |
| 2018/0220466 A1* | 8/2018 | Park | H04W 74/002 |
| 2019/0141754 A1* | 5/2019 | Bai | H04L 27/2607 |
| 2020/0186236 A1* | 6/2020 | Wang | H04W 52/282 |
| 2021/0029658 A1* | 1/2021 | Mahalingam | H04W 56/0045 |
| 2021/0321464 A1 | 10/2021 | Lin et al. | |
| 2021/0329705 A1* | 10/2021 | Ljung | H04W 74/0833 |
| 2021/0377825 A1* | 12/2021 | Deenoo | H04W 36/0077 |
| 2022/0086918 A1* | 3/2022 | Liu | H04W 24/08 |
| 2022/0132593 A1* | 4/2022 | Ren | H04W 56/0045 |
| 2022/0159741 A1* | 5/2022 | Hoang | H04W 72/0453 |
| 2022/0217782 A1* | 7/2022 | Nishio | H04W 64/003 |
| 2022/0329314 A1* | 10/2022 | Liu | H04W 56/0045 |
| 2023/0056527 A1 | 2/2023 | Medles et al. | |
| 2023/0361865 A1 | 11/2023 | Kusashima et al. | |

FOREIGN PATENT DOCUMENTS

| | | |
|---|---|---|
| WO | 2019062481 A2 | 4/2019 |
| WO | 2019097922 A1 | 5/2019 |
| WO | 2021028853 A1 | 2/2021 |

OTHER PUBLICATIONS

Author Unknown, "Technical Specification Group Radio Access Network; Study on New Radio (NR) to support non-terrestrial networks (Release 15)," Technical Report 38.811, Version 15.1.0, Jun. 2019, 3GPP Organizational Partners, 126 pages.

Author Unknown, "Technical Specification Group Services and System Aspects; Service requirements for the 5G system; Stage 1 (Release 16)," Technical Specification 22.261, Version 16.8.0, Jun. 2019, 3GPP Organizational Partners, 73 pages.

Author Unknown, "Technical Specification Group Core Network and Terminals; Non-Access-Stratum (NAS) functions related to Mobile Station (MS) in idle mode (Release 16)," Technical Specification 23.122, Version 16.2.0, Jun. 2019, 3GPP Organizational Partners, 72 pages.

Author Uknown, "Technical Specification Group Radio Access Network; NR; User Equipment (UE) radio transmission and reception; Part 1: Range 1 Standalone (Release 15)," Technical Specification 38.101-1, Version 15.6.0, Jun. 2019, 3GPP Organizational Partners, 211 pages.

Author Unknown, "Technical Specification Group Radio Access Network; NR; NR and NG-RAN Overall Description; Stage 2 (Release 15)," Technical Specification 38.300, Version 15.6.0, Jun. 2019, 3GPP Organizational Partners, 99 pages.

Author Unknown, "Technical Specification Group Radio Access Network; NR; User Equipment (UE) procedures In Idle mode and RRC Inactive state (Release 15)," Technical Specification 38.304, Version 15.4.0, Jun. 2019, 3GPP Organizational Partners, 29 pages.

Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 519 pages.

Mediatek Inc., "R1-1906464: Doppler, Timing Advance and RACH in NR-NTN," 3GPP TSG RAN WG1 Meeting #97, May 13-17, 2019, Reno, Nevada, 8 pages.

Nokia, et al., "R1-1906087: Doppler Compensation, Uplink Timing Advance and Random Access in NTN," 3GPP TSG RAN WG1 Meeting #97, May 13-17, 2019, Reno, Nevada, 13 pages.

ZTE, et al., "R2-1908246: Random Access Procedure and RACH Capacity in NTN," 3GPP TSG-RAN WG2 Meeting #106, May 13-17, 2019, Reno, Nevada, 14 pages.

International Search Report and Written Opinion for International Patent Application No. PCT/IB2020/057598, mailed Oct. 19, 2020, 17 pages.

International Preliminary Report on Patentability for International Patent Application No. PCT/IB2020/057598, mailed Dec. 16, 2021, 33 pages.

International Search Report and Written Opinion for International Patent Application No. PCT/IB2020/057601, mailed Oct. 22, 2020, 16 pages.

International Preliminary Report on Patentability for International Patent Application No. PCT/IB2020/057601, mailed Dec. 16, 2021, 25 pages.

Non-Final Office Action for U.S. Appl. No. 17/635,506, mailed Mar. 20, 2024, 15 pages.

Examination Report for European Patent Application No. 20757965.7, mailed May 13, 2024, 7 pages.

Examination Report for European Patent Application No. 20757966.5, mailed May 13, 2024, 7 pages.

Hearing Notice for Indian Patent Application No. 202247012709, mailed Jan. 10, 2025, 2 pages.

Advisory Action for U.S. Appl. No. 17/635,506, mailed Jan. 6, 2025, 3 pages.

Non-Final Office Action for U.S. Appl. No. 17/635,506, mailed Jul. 9, 2024, 18 pages.

* cited by examiner

RANDOM ACCESS IN NETWORK SUPPORTING UEs WITH DIFFERENT PRE-COMPENSATION AND/OR GNSS CAPABILITIES

RELATED APPLICATIONS

This application is a 35 U.S.C. § 371 national phase filing of International Application No. PCT/IB2020/057598, filed Aug. 12, 2020, which claims the benefit of provisional patent application Ser. No. 62/887,412, filed Aug. 15, 2019, and provisional patent application Ser. No. 62/891,783, filed Aug. 26, 2019, the disclosures of which are hereby incorporated herein by reference in their entireties.

TECHNICAL FIELD

The present disclosure relates to random access in a cellular communications system.

BACKGROUND

In Third Generation Partnership Project (3GPP) Release 8, the Evolved Packet System (EPS) was specified. EPS is based on the Long Term Evolution (LTE) radio network and the Evolved Packet Core (EPC). It was originally intended to provide voice and Mobile Broadband (MBB) services but has continuously evolved to broaden its functionality. Since Release 13 Narrowband Internet of Things (NB-IoT) and LTE Machine Type Communication (LTE-M) are part of the LTE specifications and provide connectivity to massive Machine Type Communications (mMTC) services.

In 3GPP Release 15, the first release of the Fifth Generation (5G) System (5GS) was developed. This is a new generation's radio access technology intended to serve use cases such as enhanced MBB (eMBB), Ultra-Reliable and Low Latency Communication (URLLC) and mMTC. 5G includes the New Radio (NR) access stratum interface and the 5G Core Network (5GC). The NR physical and higher layers are reusing parts of the LTE specification, and to that add needed components when motivated by the new use cases.

Random Access

LTE, NB-IoT, and NR all support random access by means of Physical Random Access Channel (PRACH) preamble transmissions. For LTE and NR the preambles are defined by Zadoff-Chu sequences. For NB-IoT the preamble is defined by a frequency hopping sinusoidal waveform. In all three cases, the network configures periodically occurring time-frequency resources in which User Equipments (UEs) may trigger PRACH preamble transmission. In the reply to the PRACH preamble, the network will correct the timing of the UE by signaling a so-called Timing Advance (TA).

The window for receiving the PRACH preamble is configurable and would typically depend on the subcarrier spacing of the network as well as the expected size of the network in order to make sure that UEs that are not in-synch with the network due to the propagation delay can still be detected within the window.

FIG. 1 illustrates the contention-free random access procedure and is reproduced from 3GPP Technical Specification (TS) 38.300 V15.6.0.

Random Access for Non-Terrestrial Network (NTN)

For UEs with Global Navigation Satellite System (GNSS) capabilities, in PCT Patent Application No. PCT/IB2019/056739 entitled "RANDOM ACCESS PROCEDURES FOR SATELLITE COMMUNICATIONS," methods for performing random access to NTN by pre-compensating using, e.g., GNSS are described. The procedure outlines how the UE uses open loop estimation of the distance and delay with respect to the serving cell (e.g., via GNSS) in order to make sure that the network receives the preamble inside the window. It also outlines details about what needs to be signaled as a part of Msg 2 and Msg 3 of the random access procedure.

For UEs without GNSS capabilities, random access becomes more difficult as the preamble receiving window needs to be a lot larger compared to in the terrestrial case due to the propagation delay. This can however be done where the network extends the preamble window by implementation. Another difficulty is to ensure that Doppler is corrected for by the UE.

Cell and PLMN Selection

In initial cell selection, the UE attempts to find a suitable cell.

The following is an excerpt from 3GPP TS 38.304 V15.4.0, section 4.5:

--- suitable cell:

A cell is considered as suitable if the following conditions are fulfilled:
- The cell is part of either the selected PLMN or the registered PLMN or PLMN of the Equivalent PLMN list;
- The cell selection criteria are fulfilled, see clause 5.2.3.2.

According to the latest information provided by NAS:
- The cell is not barred, see clause 5.3.1;
- The cell is part of at least one TA that is not part of the list of "Forbidden Tracking Areas" (TS 22.261 [12]), which belongs to a PLMN that fulfils the first bullet above.

---

The following is an excerpt from 3GPP TS 38.304 V15.4.0, section 5.2.3.2:

5.2.3.2 Cell Selection Criterion

The cell selection criterion S is fulfilled when:

$$Srxlev > 0 \text{ AND } Squal > 0$$

where:

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

where:

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 [3] (dB) |
| $Qr_{xlevmeas}$ | Measured cell RX level value (RSRP) |
| Qqualmeas | Measured cell quality value (RSRQ) |
| $Q_{rxlevmin}$ | Minimum required RX level in the cell (dBm). If the UE supports SUL frequency for this cell, Qrxlevmin is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |

| | |
|---|---|
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122 [9]. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122 [9]. |
| $P_{compensation}$ | If the UE supports the additionalPmax in the NR-NS-PmaxList, if present, in SIB1, SIB2 and SIB4: $\max(P_{EMAX1} - P_{PowerClass}, 0) - (\min(P_{EMAX2}, P_{PowerClass}) - \min(P_{EMAX1}, P_{PowerClass}))$ (dB); else: $\max(P_{EMAX1} - P_{PowerClass}, 0)$ (dB) |
| $P_{EMAX1}, P_{EMAX2}$ | Maximum TX power level of a UE may use when transmitting on the uplink in the cell (dBm) defined as $P_{EMAX}$ in TS 38.101 [15]. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331 [3], else $P_{EMAX1}$ and $P_{EMAX2}$ are obtained from the p-Max and NR-NS-PmaxList respectively in SIB1, SIB2 and SIB4 for normal UL as specified in TS 38.331 [3]. |
| PPowerClass | Maximum RF output power of the UE (dBm) according to the UE power class as defined in TS 38.101-1 [15]. |

The signalled values $Q_{rxlevminoffset}$ and $Q_{qualminoffset}$ are only applied when a cell is evaluated for cell selection as a result of a periodic search for a higher priority PLMN while camped normally in a VPLMN (TS 23.122 [9]). During this periodic search for higher priority PLMN, the UE may check the S criteria of a cell using parameter values stored from a different cell of this higher priority PLMN.

Cell Status and Cell Reservations

The following is an excerpt from 3GPP TS 38.304 V15.4.0, section 5.3.1:

---

5.3.1 Cell status and cell reservations

Cell status and cell reservations are indicated in the MIB or SIB1 message TS 38.331 [3] by means of three fields:
- cellBarred (IE type: "barred" or "not barred")
  Indicated in MIB message. In case of multiple PLMNs indicated in SIB1, this field is common for all PLMNs
- cellReservedForOperatorUse (IE type: "reserved" or "not reserved")
  Indicated in SIB1 message. In case of multiple PLMNs indicated in SIB1, this field is specified per PLMN.
- cellReservedForOtherUse (IE type: "true")
  Indicated in SIB1 message. In case of multiple PLMNs indicated in SIB1, this field is common for all PLMNs.

When cell status is indicated as "not barred" and "not reserved" for operator use and not "true" for other use,
- All UEs shall treat this cell as candidate during the cell selection and cell reselection procedures.

When cell status is indicated as "true" for other use,
- The UE shall treat this cell as if cell status is "barred".

When cell status is indicated as "not barred" and "reserved" for operator use for any PLMN and not "true" for other use,
- UEs assigned to Access Identity 11 or 15 operating in their HPLMN/EHPLMN shall treat this cell as candidate during the cell selection and reselection procedures if the field cellReservedForOperatorUse for that PLMN set to "reserved".
- UEs assigned to an Access Identity in the range of 0, 1, 2 and 12 to 14 shall behave as if the cell status is "barred" in case the cell is "reserved for operator use" for the registered PLMN or the selected PLMN.

NOTE 1: Access Identities 11, 15 are only valid for use in the HPLMN/ EHPLMN; Access Identities 12, 13, 14 are only valid for use in the home country as specified in TS 22.261 [12].

When cell status "barred" is indicated or to be treated as if the cell status is "barred",
- The UE is not permitted to select/reselect this cell, not even for emergency calls.
- The UE shall select another cell according to the following rule:
- If the cell is to be treated as if the cell status is "barred" due to being unable to acquire the MIB
  - the UE may exclude the barred cell as a candidate for cell selection/reselection for up to 300 seconds.
  - the UE may select another cell on the same frequency if the selection criteria are fulfilled.
- else
  - If the cell is to be treated as if the cell status is "barred" due to being unable to acquire the SIB1 or due to trackingAreaCode being absent in SIB1 as specified in TS 38.331 [3]:
    - The UE may exclude the barred cell as a candidate for cell selection/reselection for up to 300 seconds.
  - If the field intraFreqReselection in MIB message is set to "allowed", the UE may select another cell on the same frequency if re-selection criteria are fulfilled;
    - The UE shall exclude the barred cell as a candidate for cell selection/reselection for 300 seconds.

| 5.3.1 Cell status and cell reservations |
|---|
| - If the field intraFreqReselection in MIB message is set to "not allowed" the UE shall not re-select a cell on the same frequency as the barred cell;<br>- The UE shall exclude the barred cell and the cells on the same frequency as a candidate for cell selection/reselection for 300 seconds.<br>The cell selection of another cell may also include a change of RAT. |

NTN

In Release 15, 3GPP started the work to prepare NR for operation in an NTN. The work was performed within the study item "NR to support Non-Terrestrial Networks" and resulted in 3GPP Technical Report (TR) 38.811 "Study on New Radio (NR) to support non-terrestrial networks," V15.1.0. In Release 16, the work to prepare NR for operation in an NTN network continues with the study item "Solutions for NR to support Non-Terrestrial Network."

In parallel, the interest to adapt LTE for operation in NTN is growing, with several systems having been announced using satellite-adopted LTE.

A satellite radio access network usually includes the following components:
  A satellite that refers to a space-borne platform.
  An earth-based gateway that connects the satellite to a base station or a core network, depending on the choice of architecture.
  A feeder link that refers to the link between a gateway and a satellite.
  A service link that refers to the link between a satellite and a UE.

Two popular architectures are the bent pipe transponder and the regenerative transponder architectures. In the first case, which is illustrated in FIG. 2, the base station is located on Earth behind the gateway, and the satellite operates as a repeater forwarding the feeder link signal to the service link, and vice versa. In the second case, the satellite is in the base station and the service link connects it to the Earth-based core network.

Depending on the orbit altitude, a satellite may be categorized as Low Earth Orbit (LEO), Medium Earth Orbit (MEO), or Geostationary Earth Orbit (GEO) satellite.
  LEO: typical heights ranging from 250-1,500 kilometers (km), with orbital periods ranging from 90-120 minutes.
  MEO: typical heights ranging from 5,000-25,000 km, with orbital periods ranging from 3-15 hours.
  GEO: height at about 35,786 km, with an orbital period of 24 hours.

A communication satellite typically generates several beams over a given area. The footprint of a beam is usually in an elliptic shape, which has been traditionally considered a cell. The footprint of a beam is also often referred to as a spotbeam. The spotbeam may move over the Earth's surface with the satellite movement or may be Earth fixed with some beam pointing mechanism used by the satellite to compensate for its motion. The size of a spotbeam depends on the system design, which may range from tens of kilometers to a few thousands of kilometers. FIG. 2 shows an example of parts of a LEO satellite network including two satellites where each satellite provides coverage in two cells.

UE Capability Signaling

UE capabilities tell the network what type of radio access capabilities that a specific UE might have. The procedure for the transfer of these capabilities is specified in 3GPP TS 38.331 V15.6.0, which may include receive and transmit capabilities such as single/dual radio, dual receiver, or things such as frequency band or features implemented.

SUMMARY

Systems and methods for supporting random access for wireless devices have different levels of random access pre-compensation and/or Global Navigation Satellite System (GNSS) capabilities are disclosed. In one embodiment, a method performed by a wireless device comprises obtaining two or more random access configurations for two or more wireless device classes that support different levels of pre-compensation for random access, have different GNSS capabilities, or both. The method further comprises selecting a random access configuration to be used by the wireless device from the two or more random access configurations. In this manner, random access is tailored to the capabilities of the wireless device.

In one embodiment, the method further comprises transmitting a random access preamble in accordance with the selected random access configuration.

In one embodiment, the two or more wireless device classes comprise a first wireless device class that performs neither time compensation nor frequency compensation before starting initial access, a second wireless device class that performs time compensation, but not frequency compensation, before starting initial access, a third wireless device class that performs frequency compensation, but not time compensation, before starting initial access, a fourth wireless device class that performs both time compensation and frequency compensation before starting initial access, or any combination of two or more of the first, second, third, or fourth wireless device classes. In one embodiment, the two or more wireless device classes comprise a first wireless device class that has GNSS capability and/or a second wireless device class that does not have GNSS capability.

In one embodiment, the two or more random access configurations indicate different Random Access Channel (RACH) occasions. In another embodiment, the two or more random access configurations indicate the same RACH occasions but comprise other configurations related to random access that are different. In one embodiment, the other configurations related to random access comprise: (a) different random access preambles for the two or more random access configurations, (b) different random access preamble sets for the two or more random access configurations, (c) different amounts of random access attempts for the two or more random access configurations, (d) different random access related timers for the two or more random access configurations, or (e) any combination of two or more of (a)-(d).

In one embodiment, selecting the random access configuration to be used by the wireless device comprises selecting the random access configuration to be used by the wireless device from the two or more random access configurations based on capabilities of the wireless device.

In one embodiment, selecting the random access configuration to be used by the wireless device comprises selecting the random access configuration to be used by the wireless device from the two or more random access configurations based on capabilities of the wireless device and one or more criteria. The one or more criteria comprise: (i) radio quality, (ii) an uncertainty of a pre-compensation feature of the wireless device, (iii) a round trip time between the wireless device and the base station, or (iv) any combination of two or more of (i)-(iii).

Corresponding embodiments of a wireless device are also disclosed. In one embodiment, a wireless device is adapted to obtain two or more random access configurations for two or more wireless device classes that support different levels of pre-compensation for random access, have different GNSS capabilities, or both. The wireless device is further adapted to select a random access configuration to be used by the wireless device from the two or more random access configurations.

In one embodiment, the wireless device comprises one or more transmitters, one or more receivers, and processing circuitry associated with the one or more transmitters and the one or more receivers. The processing circuitry is configured to cause the wireless device to obtain the two or more random access configurations for the two or more wireless device classes that support different levels of pre-compensation for random access, have different GNSS capabilities, or both, and select the random access configuration to be used by the wireless device from the two or more random access configurations.

In another embodiment, a method performed by a wireless device comprises receiving, from a base station, a random access configuration for a wireless device class of the wireless device, wherein the wireless device class of the wireless device is one of two or more wireless device classes that support different levels of pre-compensation for random access, have different GNSS capabilities, or both. The method further comprises transmitting a random access preamble in accordance with the received random access configuration.

In one embodiment, the method further comprises transmitting, to the base station, wireless device capability information comprising information that indicates the wireless device class of the wireless device or information from which the wireless device class of the wireless device can be derived.

In one embodiment, different random access configurations are defined for the two or more wireless device classes. In one embodiment, the different random access configurations indicate different RACH occasions. In one embodiment, the different random access configurations indicate the same RACH occasions but comprise other configurations related to random access that are different. In one embodiment, the other configurations related to random access comprise: (a) different random access preambles for the two or more random access configurations, (b) different random access preamble sets for the two or more random access configurations, (c) different amounts of random access attempts for the two or more random access configurations, (d) different random access related timers for the two or more random access configurations, or (e) any combination of two or more of (a)-(d).

In one embodiment, the two or more wireless device classes comprise a first wireless device class that performs neither time compensation nor frequency compensation before starting initial access, a second wireless device class that performs time compensation, but not frequency compensation, before starting initial access, a third wireless device class that performs frequency compensation, but not time compensation, before starting initial access, and/or a fourth wireless device class that performs both time compensation and frequency compensation before starting initial access.

In one embodiment, the two or more wireless device classes comprise a first wireless device class that has GNSS capability and/or a second wireless device class that does not have GNSS capability.

In one embodiment, the random access configuration received from the base station is a random access configuration to be used by the wireless device when performing a random access towards a cell served by the base station.

In one embodiment, receiving the random access configuration comprises receiving the random access configuration in a handover command. In one embodiment, transmitting the random access preamble in accordance with the received random access configuration comprises transmitting the random access preamble in accordance with the received random access configuration towards a target cell for a handover.

Corresponding embodiments of a wireless device are also disclosed. In one embodiment, a wireless device is adapted to receive, from a base station, a random access configuration for a wireless device class of the wireless device, wherein the wireless device class of the wireless device is one of two or more wireless device classes that support different levels of pre-compensation for random access, have different GNSS capabilities, or both. The wireless device is further adapted to transmit a random access preamble in accordance with the received random access configuration.

In one embodiment, the wireless device comprises one or more transmitters, one or more receivers, and processing circuitry associated with the one or more transmitters and the one or more receivers. The processing circuitry is configured to cause the wireless device to receive, from the base station, the random access configuration for the wireless device class of the wireless device, and transmit the random access preamble in accordance with the received random access configuration.

Embodiments of a method performed by a base station are also disclosed. In one embodiment, a method performed by a base station comprises providing, to one or more wireless devices, two or more random access configurations for two or more wireless device classes that support different levels of pre-compensation for random access, have different GNSS capabilities, or both.

In one embodiment, the method further comprises receiving a random access preamble from a wireless device in accordance with a random access configuration from among the two or more random access configurations. In one embodiment, the method further comprises determining a wireless device class of the wireless device based on the random access configuration used for the random access preamble.

In one embodiment, the two or more wireless device classes comprise a first wireless device class that performs neither time compensation nor frequency compensation before starting initial access, a second wireless device class that performs time compensation, but not frequency compensation, before starting initial access, a third wireless device class that performs frequency compensation, but not time compensation, before starting initial access, and/or a fourth wireless device class that performs both time compensation and frequency compensation before starting initial access.

In one embodiment, the two or more wireless device classes comprise a first wireless device class that has GNSS capability and/or a second wireless device class that does not have GNSS capability.

In one embodiment, the two or more random access configurations indicate different RACH occasions. In one embodiment, the two or more random access configurations indicate the same RACH occasions but comprise other configurations related to random access that are different. In one embodiment, the other configurations related to random access comprise: (a) different random access preambles for the two or more random access configurations, (b) different random access preamble sets for the two or more random access configurations, (c) different amounts of random access attempts for the two or more random access configurations, (d) different random access related timers for the two or more random access configurations, or (e) any combination of two or more of (a)-(d).

Corresponding embodiments of a base station are also disclosed. In one embodiment, a base station is adapted to provide, to one or more wireless devices, two or more random access configurations for two or more wireless device classes that support different levels of pre-compensation for random access, have different Global Navigation Satellite System, GNSS, capabilities, or both.

In one embodiment, the base station comprises processing circuitry configured to cause the base station to provide, to the one or more wireless devices, the two or more random access configurations for the two or more wireless device classes that support different levels of pre-compensation for RACH, have different GNSS capabilities, or both.

In another embodiment, a method performed by a base station comprises selecting a random access configuration to be used by a wireless device from among two or more random access configurations for two or more wireless device classes that support different levels of pre-compensation for random access, have different GNSS capabilities, or both. The method further comprises transmitting, to the wireless device, the selected random access configuration for the wireless device.

In one embodiment, the method further comprises receiving a random access preamble in accordance with the selected random access configuration.

In one embodiment, the method further comprises receiving, from the wireless device, wireless device capability information comprising information that indicates a wireless device class of the wireless device or information from which the wireless device class of the wireless device can be derived. Further, selecting the random access configuration to be used by the wireless device comprises selecting the random access configuration to be used by the wireless device based on the received wireless device capability information.

In one embodiment, the two or more random access configurations indicate different RACH occasions. In another embodiment, the two or more random access configurations indicate the same RACH occasions but comprise other configurations related to random access that are different. In one embodiment, the other configurations related to random access comprise: (a) different random access preambles for the two or more random access configurations, (b) different random access preamble sets for the two or more random access configurations, (c) different amounts of random access attempts for the two or more random access configurations, (d) different random access related timers for the two or more random access configurations, or (e) any combination of two or more of (a)-(d).

In one embodiment, the two or more wireless device classes comprise a first wireless device class that performs neither time compensation nor frequency compensation before starting initial access, a second wireless device class that performs time compensation, but not frequency compensation, before starting initial access, a third wireless device class that performs frequency compensation, but not time compensation, before starting initial access, and/or a fourth wireless device class that performs both time compensation and frequency compensation before starting initial access.

In one embodiment, the two or more wireless device classes comprise a first wireless device class that has GNSS capability and/or a second wireless device class that does not have GNSS capability.

In one embodiment, selecting the random access configuration to be used by the wireless device comprises selecting the random access configuration to be used by the wireless device from the two or more random access configurations based on capabilities of the wireless device and one or more criteria.

Corresponding embodiments of a base station are also disclosed. In one embodiment, a base station is adapted to select a random access configuration to be used by a wireless device from among two or more random access configurations for two or more wireless device classes that support different levels of pre-compensation for random access, have different GNSS capabilities, or both. The base station is further adapted to transmit, to the wireless device, the selected random access configuration for the wireless device.

In one embodiment, the base station comprises processing circuitry configured to cause the base station to select the random access configuration to be used by the wireless device from among the two or more random access configurations for the two or more wireless device classes that support different levels of pre-compensation for random access, have different GNSS capabilities, or both, and transmit, to the wireless device, the selected random access configuration for the wireless device.

In another embodiment, a method performed by a base station comprises selecting a target cell for a handover of a wireless device based on one or more capabilities of the wireless device, the one or more capabilities of the wireless device comprising a random access pre-compensation capability, a GNSS capability, or both a random access pre-compensation capability and a GNSS capability. The method further comprises sending, to the wireless device, a random access configuration to be used by the wireless device when performing a random access towards the target cell, the random access configuration being based on the one or more capabilities of the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
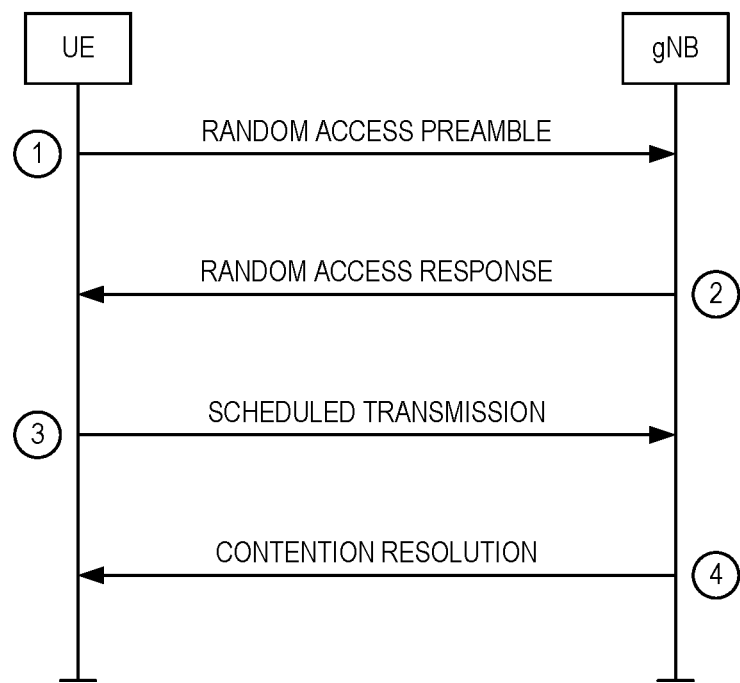
FIG. 1 illustrates the conventional contention-free random access procedure and is reproduced from 3GPP Technical Specification (TS) 38.300 V15.6.0.
Figure 2:
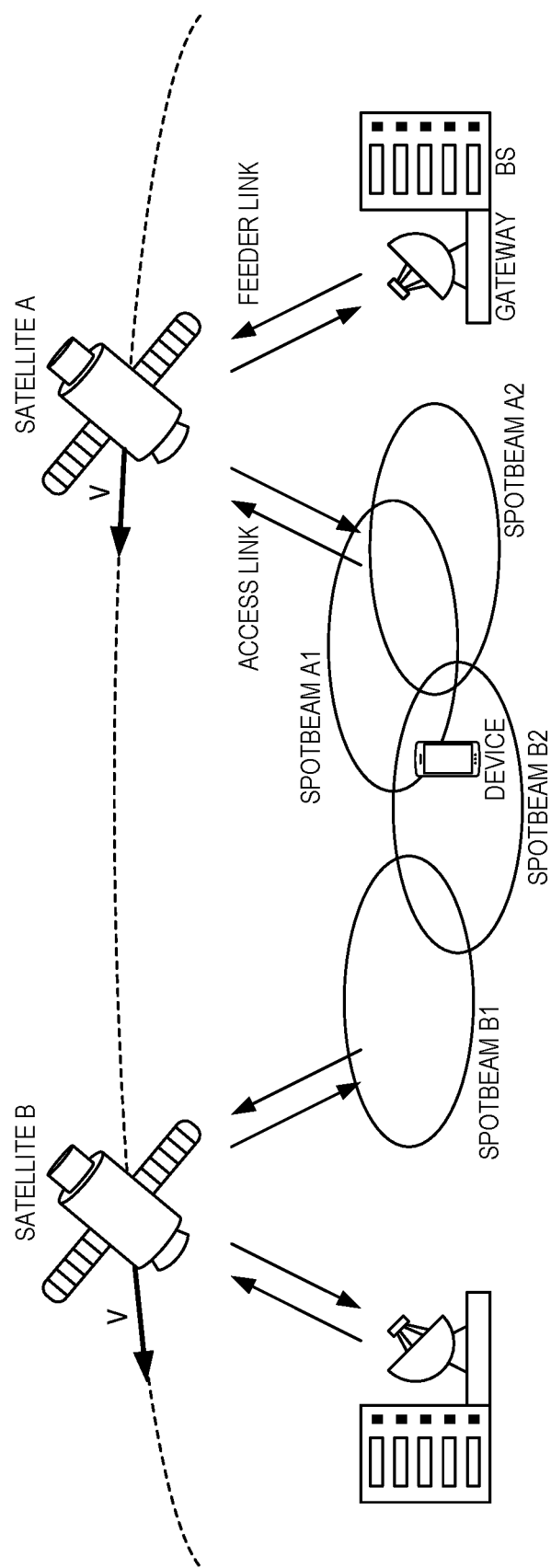
FIG. 2 illustrates an example of a non-terrestrial radio access network having a bent pipe architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Note that the description given herein focuses on a Third Generation Partnership Project (3GPP) cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to Fifth Generation (5G) New Radio (NR) concepts, beams may be used instead of cells and, as such, it is important to note that the concepts described herein are equally applicable to both cells and beams.

There currently exist certain challenge(s) with respect to Non-Terrestrial Networks (NTNs). There is a need to distinguish between NTN UEs with different Global Navigation Satellite System (GNSS) capabilities prior to random access. This is due to a stark contrast in the residual frequency error and timing uncertainty experienced by UEs with and without GNSS. For example, consider a MSG1 (i.e., a Physical Random Access Channel (PRACH) preamble) transmission from a GNSS-equipped UE which has already compensated for the propagation delay and the Doppler frequency shift (e.g., leveraging satellite ephemeris data and location information). In this case, the residual timing uncertainty that the NR base station (gNB) receiver has to cope with is similar to a terrestrial UE. Therefore, the UE can be configured with one of the existing PRACH formats for random access. Now consider MSG1 transmission from a UE lacking GNSS capability. Now the UE can only partially pre-compensate (e.g., leveraging the cell-level broadcast of the delay and Doppler shift information at a reference point in the cell) for the propagation delay and Doppler frequency shift before MSG1 transmission. This means that the gNB receiver will have to cope with a substantially larger timing uncertainty and residual Doppler shift. The PRACH formats or configurations suitable for such UEs may not be the same as those for GNSS-equipped UEs. This motivates the need to regulate random access in an NTN scenario with differently-abled UEs.

Certain aspects of the present disclosure and their embodiments may provide solutions to the aforementioned or other challenges. Systems and methods are disclosed for making coexistence between different random access methods possible by defining different classes, features, and/or capabilities to differentiate UEs when connecting to a cell.

The present disclosure describes embodiments including:
  embodiments for defining UE classes and/or UE features based on random access capabilities;
  embodiments for using the UE classes and/or UE features to give different random access configurations in both idle and connected mode; and
  embodiments for minimizing and distributing signaling to enable GNSS and non-GNSS UEs to both be able to perform random access in the same system.

Certain embodiments may provide one or more of the following technical advantage(s). One advantage of embodiments of the present disclosure is that random access resources can be configured in a way that fits the capabilities of the UE so that the network may reduce the overall amount of resources required. For certain UEs with good GNSS/pre-compensation abilities, the random access resources that are needed are not much; and, for UEs without these abilities, the random access resources required will be higher. Thus, the resources should be tailored according the abilities of the UEs. The network can thus control the resources better for UEs with different capabilities on Random Access Channel (RACH) resources.

Figure 3:
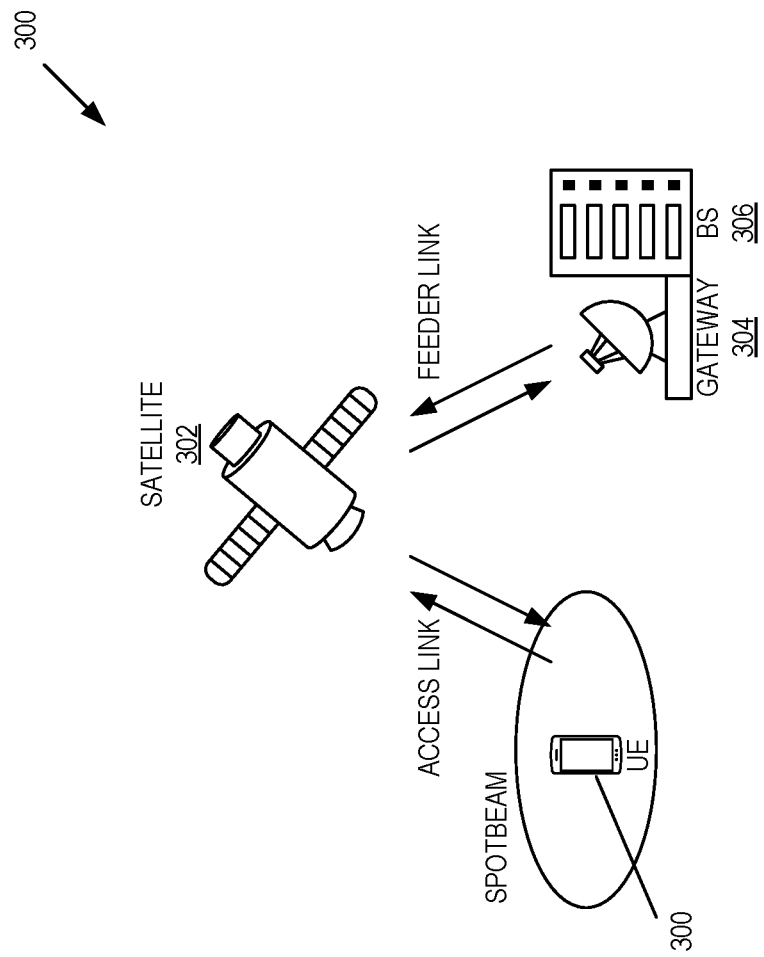
FIG. 3 illustrates one example of a wireless communication system in which embodiments of the present disclosure may be implemented.

FIG. 3 illustrates one example of a wireless communication system 300 in which embodiments of the present disclosure may be implemented. As illustrated, the wireless communication system 300 includes a satellite-based radio access network, which includes a satellite 302 (i.e., a space or airborne radio access node or platform) and one or more gateways 304 that interconnect the satellite 302 to a land-based base station component 306. The functionality of a base station described herein may be implemented in the satellite 302 or distributed between the satellite 302 and the land-based base station component 306 (e.g., the satellite 302 may implement L1 functionality and the land-based base station component 306 may implement L2 and L3 functionality). A User Equipment (UE) 308 communicates with the satellite radio access network via the satellite 302. Note that while only one UE 308 is illustrated, there may be many UEs 308. Further, different UEs 308 may have different UE capabilities (e.g., different Global Navigation Satellite System (GNSS) capabilities) and/or different UE features.

Now, a description of some example embodiments of the present disclosure is provided.

A NTN system (e.g., the wireless communication system 300 of FIG. 3) is considered where UEs (e.g., UE 308) with or without GNSS capability may support different levels of pre-compensation for random access. Below are examples of different levels of pre-compensation.

Feature 1: UE performs neither time compensation nor frequency compensation before starting initial access.
Feature 2-A: UE performs time compensation but not frequency compensation before starting initial access.
Feature 2-B: UE performs frequency compensation but not time compensation before starting initial access.
Feature 3: UE performs both time compensation and frequency compensation before starting initial access.

For concreteness, the discussion below uses the above Feature 1/2A/2B/3 as a running example. The discussion below applies to different definitions of the capabilities. As another example, UEs may be grouped based on their GNSS capability: GNSS-capable UE and GNSS-incapable UE.

In one embodiment, UE classes are defined based on the level of pre-compensation the UE is able to do. UE classes may be equivalent to the above Features 1/2/3 or a combination of those. These may also be called Random Access Channel (RACH) classes.

In addition to the UE classes, UE capability signaling may be defined, as the network may need this information for, e.g., connected mode mobility.

In one embodiment, the network (e.g., a base station such as, e.g., the base station component 306) may configure different RACH configurations for different UEs (e.g., different UEs 308) that have different levels of pre-compensation for random access (e.g., different Feature levels) or belong to different UE classes.

Figure 4:
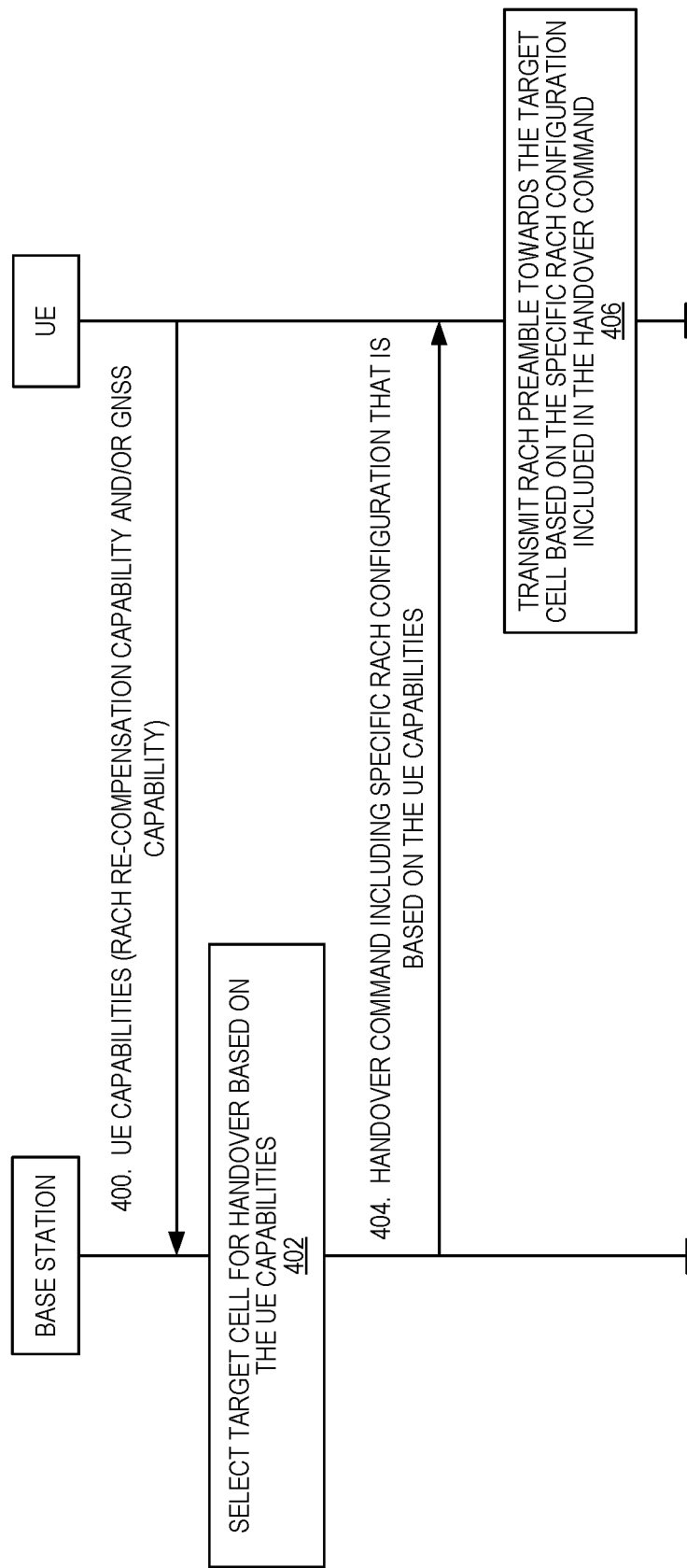
FIG. 4 illustrates the operation of a base station and a UE in accordance with at least some aspects of handover related embodiment described in the present disclosure.

For IDLE mode UEs, RACH configurations may be broadcasted by means of system information. For connected mode UEs, the RACH configuration of a particular connected UE is given in dedicated signaling. Based on UE capability signaling, the serving cell dedicates RACH resources to the UE, for example for beam management operation, i.e. how beams should be selected in case the UE loses connection to one beam. Further, in some embodiments, a target cell for a handover can be selected based on the capability signaling. The target cell may then select Random Access Channel (RACH) resources in the handover command correctly after the source cell has indicated the given capability within the handover request message. In other words, the source cell sends the UE a handover command and, in that handover command, there may be a specific RACH configuration to be used when performing random access to the target cell based on the capability of the UE. The RACH configuration is needed as, in order to connect to the target cell, the UE has to go through the random access procedure. This handover aspect is illustrated in FIG. 4. As illustrated in FIG. 4, a UE 308 sends, to a base station, information that indicates one or more capabilities of the UE 308 (step 400). The one or more capabilities include, as described herein, a RACH pre-compensation capability of the UE 308 and/or a GNSS capability of the UE 308. The base station selects a target cell for a handover of the UE 308 based on the capabilities of the UE 308 (step 402). The base station sends a handover command to the UE 308, where the handover command includes a specific RACH configuration to be used by the UE 308 when performing random access to the target cell (step 404). This specific RACH configuration is based on the capabilities of the UE 308. The UE 308 then performs transmits a random access preamble towards the target cell using the specific RACH configuration included in the handover command (step 406).

In one embodiment, the RACH configurations may indicate different RACH occasions (i.e., different time resources and/or frequency resources) to the UEs with different UE or RACH classes. In a sub-embodiment, the network (e.g., a base station or base station component 306) may determine the UE class for pre-compensation for a particular UE based on the RACH occasion in which a random access preamble is received from that particular UE, since UEs with different levels of capability use different RACH occasions.

Figure 5:
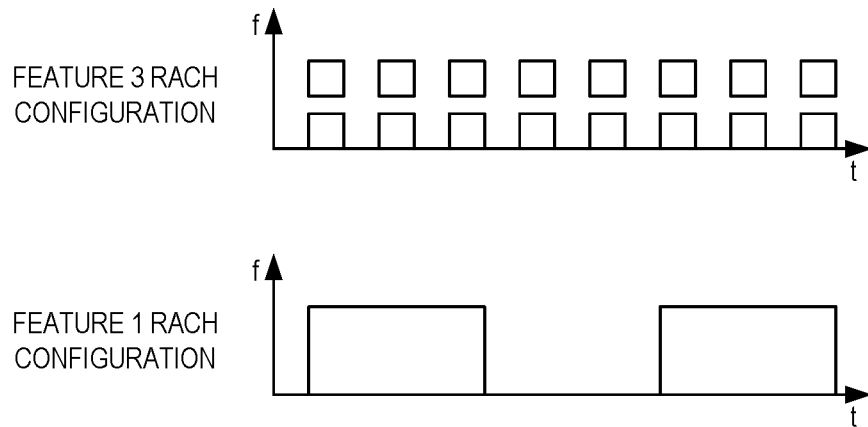
FIG. 5 illustrates an example in which Feature 1 Random Access Channel (RACH) configuration (i.e., the RACH configuration for User Equipments (UEs) having Feature 1 pre-compensation capability) has lower periodicity due to the higher network resources required and Feature 3 RACH configuration has higher periodicity.

Example: FIG. 5 illustrates an example in which Feature 1 RACH configuration (i.e., the RACH configuration for UEs having the Feature 1 pre-compensation capability) has lower periodicity due to the higher network resources required and Feature 3 RACH configuration has higher periodicity.

In another embodiment, the RACH configurations may point to the same RACH occasion but differ in other types of configurations such as preambles, the amount of random access attempts, timers, etc. In a sub-embodiment, different sets of PRACH preambles are defined for different UE classes, and the network (e.g., a base station or base station component 306) may determine the UE class of a particular UE based on the received random access preamble from that particular UE, since UEs with different levels of capability use preambles from different sets.

In one embodiment, the selection between the RACH configurations for the different features or UE classes may also consider some criteria (e.g., predefined criteria or configured criteria). Such criteria may for instance include any one or any combination of the following criteria:

Radio quality,
Reference Signal Received Power (RSRP)/Reference Signal Received Quality (RSRQ)/path loss—This may for instance be beneficial to prevent some UEs that may have the correct UE features/UE class but are in bad channel conditions, for instance preventing that might make the pre-compensation poor.

The uncertainty of the pre-compensation,
   As an example, the NR base station (gNB) may signal that the pre-compensation needs to have a certain accuracy.
Round Trip Time (RTT) smaller than a threshold.

Figure 6:
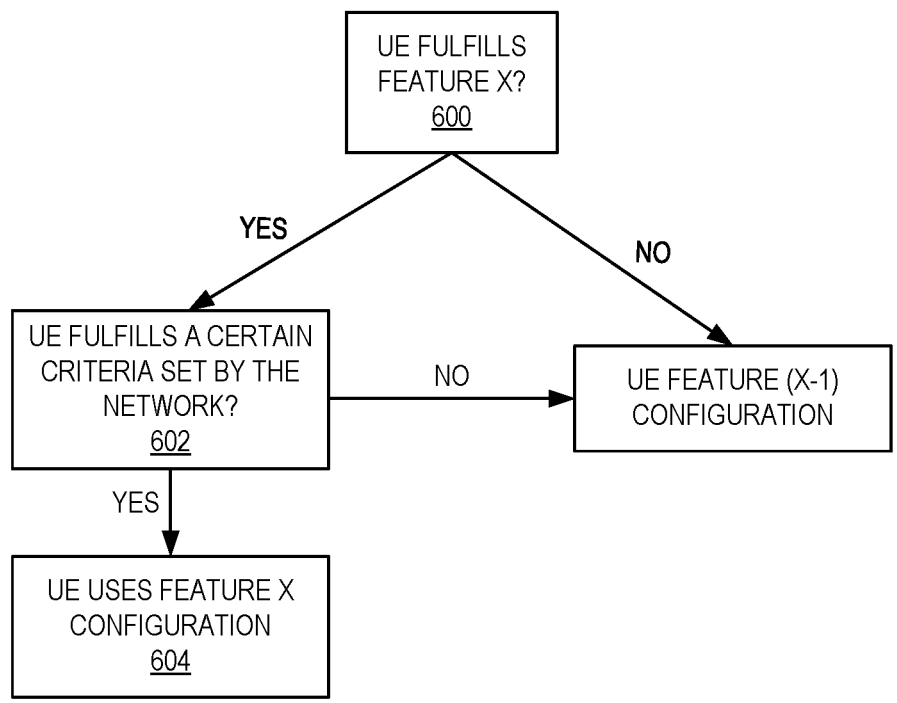
FIG. 6 is a flow chart that illustrates a process for selecting a RACH configuration for a UE based on one or more criteria in accordance with some embodiments of the present disclosure.

FIG. 6 is a flow chart that illustrates a process for selecting a RACH configuration for a UE based on one or more criteria in accordance with some embodiments of the present disclosure. The process may be performed by a base station or the UE, depending on the particular embodiment. Thus, this process is referred to as being performed by a node (where this node may be a base station or the UE). As illustrated, the node determines whether the UE fulfills a particular Feature (denoted as Feature X) (step 600). If so, the node determines whether the UE satisfies one or more criteria for the RACH configuration for Feature X (step 602). If so, the node selects the RACH configuration for Feature X as the RACH configuration to be used by the UE (step 604). If the UE does not support Feature X (step 600, NO) or if the UE does not satisfy the one or more criteria for the RACH configuration for Feature X (step 602, NO), the node continues to consider the next Feature (X-1) (e.g., steps 600-604 are repeated for the next Feature (X-1)).

In one embodiment, the UE of UE class corresponding to Feature 3 is allowed to perform random access on resources configured for lower Feature UEs.

In another embodiment, UE with Feature 3 attempts access in the following order:
   Attempts random access on resources allocated for Feature 3 and
      In case of X1 consecutive unsuccessful random access attempts
         It can perform random access using resources configured for Feature 2 UEs
      case of X2 consecutive unsuccessful random access attempts
         It can perform random access using resources configured for Feature 1 UEs
where parameters X1 and X2 can be either defined in the specification or broadcasted by the network in system information.

Figure 7:
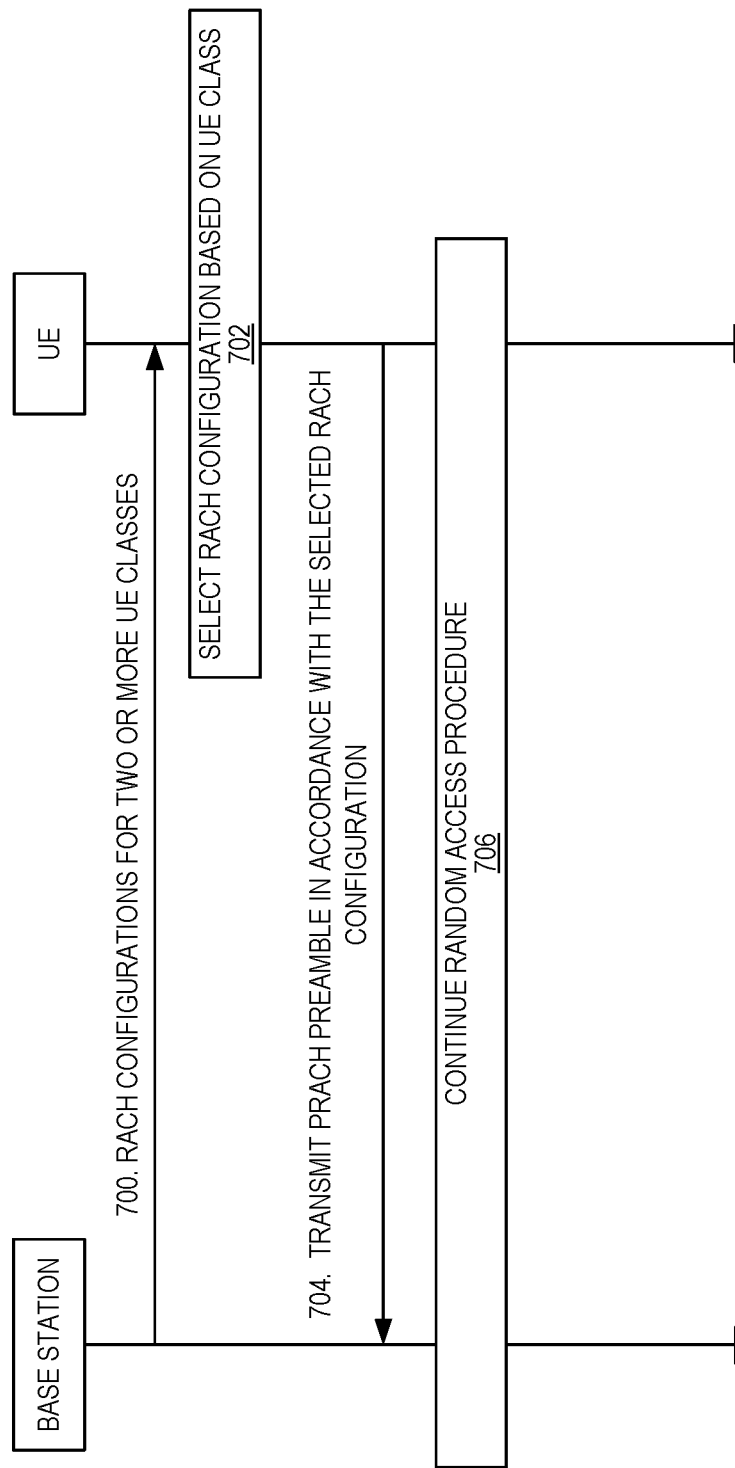
FIG. 7 illustrates the operation of a base station and a UE in accordance with at least some aspects of embodiments described in the present disclosure.

FIG. 7 illustrates the operation of a base station (e.g., the base station component 306 or a combination of the satellite 302 and the base station component 306) and a UE (e.g., UE 308) in accordance with at least some aspects of the embodiments described above. As illustrated, the base station transmits (e.g., broadcasts) two or more RACH configurations, and optionally associated RACH configuration criteria, for two or more respective UE classes (step 700). As discussed above, the UE classes may be classes of UEs that support different levels of pre-compensation for RACH (e.g., support different Features as described above) or may be classes of UEs that have different GNSS capabilities (e.g., one UE class for UEs without GNSS capabilities and another UE class for UEs with GNSS capabilities).

In this example, the UE may be in IDLE mode. The UE receives the RACH configurations, and optionally their associated RACH configuration criteria. When desiring to perform random access, in this example, the UE selects one of the two or more RACH configurations based on its capabilities (step 702). In other words, the UE selects the RACH configuration that is for its UE class. Further, if RACH configuration criteria are provided, the UE uses the RACH configuration criteria together with its UE class (e.g., supported Feature) to select the appropriate RACH configuration. The UE then transmits a PRACH preamble in accordance with the selected RACH configuration (step 704).

The base station receives the PRACH preamble from the UE. Optionally, in some embodiments, the base station determines the UE class of the UE based on the received PRACH preamble (e.g., different PRACH preamble sets may be defined for different UE classes). The base station and UE then continue the random access procedure, e.g., as illustrated in FIG. 1 (step 706).

Figure 8:
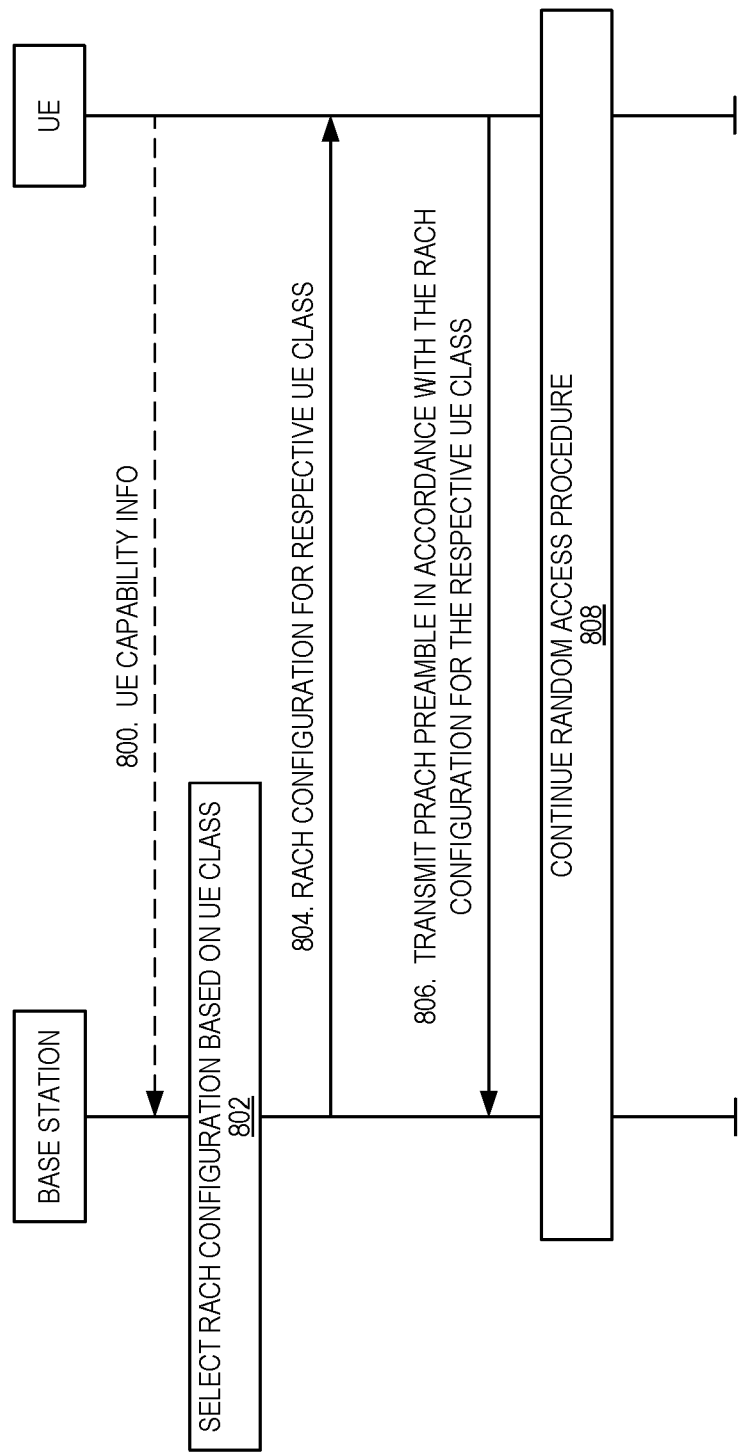
FIG. 8 illustrates the operation of a base station and a UE in accordance with at least some aspects of some other embodiments described in the present disclosure.

FIG. 8 illustrates the operation of a base station (e.g., the base station component 306 or a combination of the satellite 302 and the base station component 306) and a UE (e.g., UE 308) in accordance with at least some aspects of the embodiments described above. In this example, the UE may be in CONNECTED mode. Optionally, the UE sends its UE capability information to the base station (step 800). This UE capability information includes information that indicates the level of pre-compensation for RACH supported by the UE and/or GNSS capability of the UE. In other words, the UE capability information includes information that directly indicates the UE class of the UE or information that can be used by the base station to determine the UE class of the UE. The base station determines the UE class of the UE (e.g., based on its UE capability information from step 800) and selects the RACH configuration for the UE based on the UE class of the UE (step 802). As discussed above, the UE classes may be classes of UEs that support different levels of pre-compensation for RACH (e.g., support different Features as described above) or may be classes of UEs that have different GNSS capabilities (e.g., one UE class for UEs without GNSS capabilities and another UE class for UEs with GNSS capabilities). Different RACH configurations are defined for different UE classes. The base station transmits the selected RACH configuration to the UE (step 804).

The UE receives the RACH configuration. When desiring to perform random access, in this example, the UE transmits a PRACH preamble in accordance with the received RACH configuration (step 806).

The base station receives the PRACH preamble from the UE. The base station and UE then continue the random access procedure, e.g., as illustrated in FIG. 1 (step 808).

In addition to the currently existing challenge(s) addressed by the embodiments above, there currently exist certain additional challenge(s) with NTNs. For supporting UEs that are not able to do pre-compensation for a RACH preamble resource, the base station needs to be equipped with a longer reception window to be able to reliably receive the PRACH preambles. This can be non-feasible for some NTN networks or it may be beneficial to support this only in some cell(s) in a network. However, the current cell selection or Public Land Mobile Network (PLMN) selection rules do not allow differentiation based on PRACH pre-compensation as that has not been such an issue in terrestrial networks.

Further, if a cell is barred or reserved for other use, no UEs can camp on the cell. This does not solve the issue that, here, only those UEs that cannot access the cell due to pre-compensation requirements should not camp on the cell.

Certain aspects of the present disclosure and their embodiments may provide solutions to the aforementioned or other challenges. Systems and methods are disclosed herein for cell selection and reselection as well as PLMN selection. In some embodiments, methods that disclosed that minimize and distribute signaling to enable GNSS and non-GNSS UEs to both be able to perform random access in the same system.

Certain embodiments may provide one or more of the following technical advantage(s). Embodiments disclosed herein enable more flexible network deployment.

FIG. 900 illustrates one example of a wireless communication system 900 in which embodiments of the present disclosure may be implemented. The wireless communication system 900 is similar to that of FIG. 3. As illustrated, the wireless communication system 900 includes a satellite-based radio access network, which includes a satellite 902 (i.e., a space or airborne radio access node or platform) and one or more gateways 904 that interconnect the satellite 902 to a land-based base station component 906. The functionality of a base station described herein may be implemented in the satellite 902 or distributed between the satellite 902 and the land-based base station component 906 (e.g., the satellite 902 may implement L1 functionality and the land-based base station component 906 may implement L2 and L3 functionality). In this example, a UE 908 communicates with the satellite radio access network via the satellite 902. In addition, the system 900 may include a terrestrial RAN, which includes a base station 910 serving one or more cells. In this example, a UE 912 communicates with the terrestrial radio access network via the base station 910. Note that while only two UEs 908 and 912 are illustrated, there may be many UEs. Further, different UEs may have different UE capabilities (e.g., different Global Navigation Satellite System (GNSS) capabilities and/or different UE features.

Now, a description of some example embodiments of the present disclosure is provided.

Figure 9:
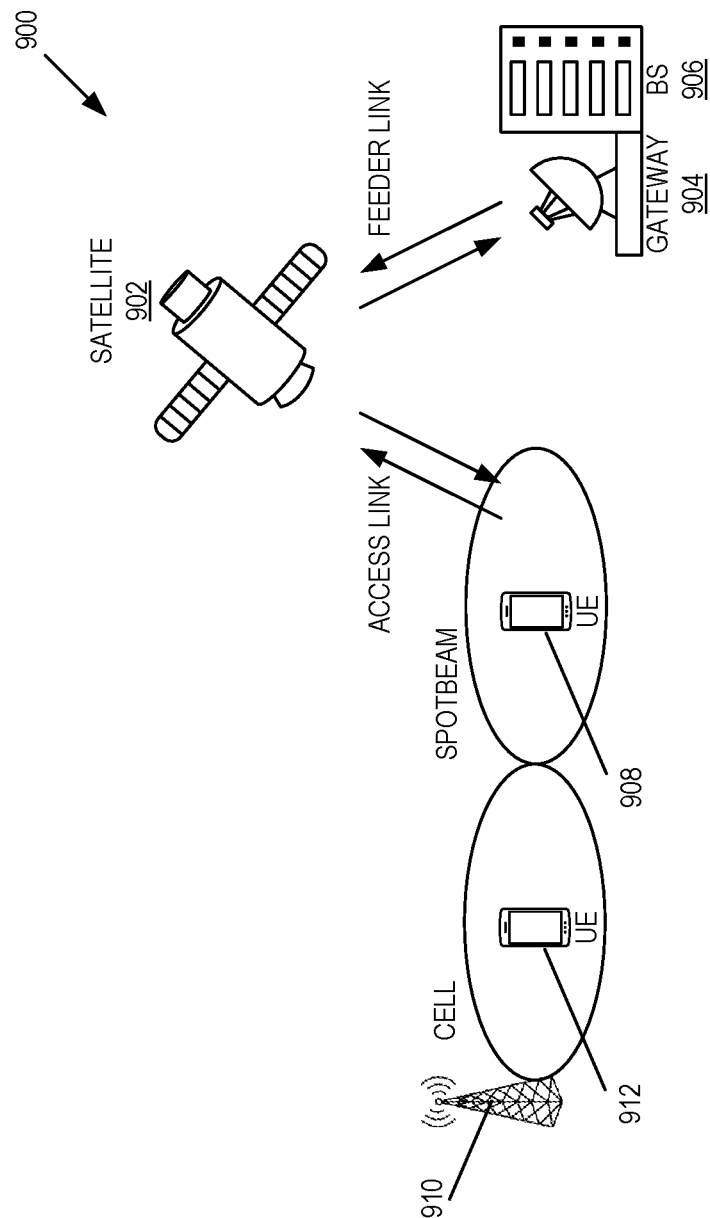
FIG. 9 illustrates another example of a wireless communication system in which embodiments of the present disclosure may be implemented.

A system that may include both a NTN (e.g., one or more satellite-based base stations) and terrestrial base stations (e.g., 910), such as, e.g., the wireless communication system 900 of FIG. 9, is considered. Here, UEs (e.g., UE 908 or 912) with or without GNSS capability may support different levels of pre-compensation for random access. Below are examples of different levels of pre-compensation. These are the same examples given above.

Feature 1: UE performs neither time compensation nor frequency compensation before starting initial access.
Feature 2-A: UE performs time compensation but not frequency compensation before starting initial access.
Feature 2-B: UE performs frequency compensation but not time compensation before starting initial access.
Feature 3: UE performs both time compensation and frequency compensation before starting initial access.

For concreteness, the discussion below uses the above Feature 1/2A/2B/3 as a running example. The discussion below applies to different definitions of the capabilities. As another example, UEs may be grouped based on their GNSS capability: GNSS-capable UE and GNSS-incapable UE.

In one embodiment, UE classes are defined based on the level of pre-compensation the UE is able to do. UE classes may be equivalent to the above Features 1/2/3 or a combination of those. These may also be called Random Access Channel (RACH) classes.

In addition to the UE classes, UE capability signaling may be defined, as the network may need this information for, e.g., connected mode mobility.

Embodiments are disclosed herein that are particularly beneficial if a cell is not supporting access for all RACH pre-compensation features, or UE or RACH classes. In that case, access control and cell selection and/or cell reselection as well as PLMN selection need to be considered.

In one embodiment, a UE checks that the RACH configuration broadcasted in the system information for a particular cell matches the UE class or RACH class of the UE, or the RACH pre-compensation features supported by the UE, before selecting or reselecting the cell for camping. In one example, in a system information block, the network (e.g., satellite-based base station 902, 906 or base station 910) broadcasts information that indicates which RACH pre-compensation feature(s) is needed (or which UE class or RACH class is needed) to select the cell. For instance, the network may indicate that only UEs with Feature X (UE is able to pre-compensate in time and frequency before starting initial access) can access the system, while UEs with Feature Y (UE is not able to pre-compensate in time and frequency before initial access) are not allowed to select the cell for camping. In this manner, classifying UEs into different classes (Feature X, Y) is used for cell and PLMN selection rules.

In another embodiment, the cell broadcasts information on RACH resources on neighbor cells for intra frequency cell search and/or neighbor frequencies or cell on neighbor frequencies. This information may be complete RACH configuration, or an indication for UE Feature/UE class/ RACH class. For example, this information about neighbor cells for intra frequency cell search and/or neighbor frequencies or cells on neighbor frequencies (e.g., for inter-frequency cell) search may include binary information that indicates whether pre-compensation is required or not. In addition or alternatively, this information may include more detailed information on whether time and/or frequency pre-compensation is required.

In another embodiment, the information that indicates which pre-compensation Feature, UE class, or RACH class is required for selection or reselection of a cell is per PLMN. In this case, the information may be provided in NAS signaling or provided in system information.

In another embodiment, new access classes are defined to categorize the UEs based on capability. For example, an access class is defined for UEs without GNSS capability. If the network desires, it can bar the access from non-GNSS UEs in a cell to protect or prioritize preamble transmissions from GNSS-equipped UEs. As an example, consider the case where the network monitors statistics for preamble detection to obtain performance metrics such as missed detection rate and false alarm rate. In case of performance degradation, i.e., these metrics exceed certain predefined threshold, the network may disable access for non-GNSS UEs. As a result, if the performance degradation goes away, the network can identify the cause and attempt to improve the PRACH performance e.g., by allocating separate PRACH resources for GNSS and non-GNSS UEs.

Figure 10:
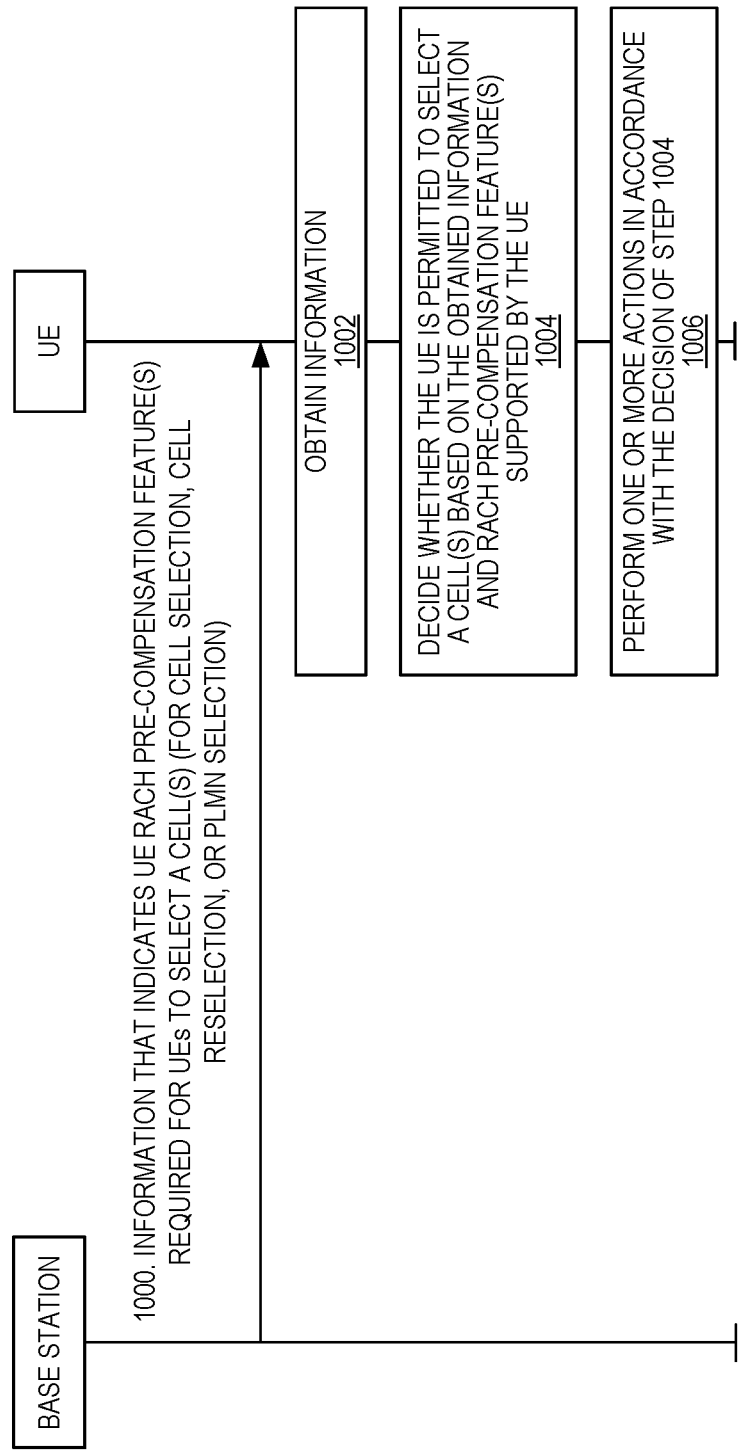
FIG. 10 illustrates the operation of a base station and a UE in accordance with at least some aspects of embodiments of the present disclosure related to cell selection, cell re-selection, and/or Public Land Mobile Network (PLMN) selection.

FIG. 10 illustrates the operation of a base station and a UE in accordance with at least some aspects of the embodiments described above. The base station may be, e.g., a satellite-based base station (e.g., the satellite-based base station formed by the satellite 902 and the base station part 906) or a terrestrial-based base station (e.g., the base station 910). The UE may be, e.g., the UE 908 or the UE 912.

As illustrated, the base station 902 sends information that indicates one or more UE RACH pre-compensation features required for UEs to select a cell(s) for cell selection, cell reselection, or PLMN selection (or conversely one or more UE RACH pre-compensation features for which UEs are not permitted to select a cell(s) for cell selection, cell reselection, or PLMN selection) (step 1000). In some embodiments, the base station broadcasts this information in system information. In some other embodiments, the base station provides this information to the UE using signaling (e.g., NAS signaling). In some embodiments, this information is provided per cell and may include such information for one or more cells. These cells may include one or more cells served by the base station 902 and/or one or more cells served by one or more neighboring base stations 902. In other words, these cells may include one or more neighbor cells for intra-frequency cell search and/or one or more cells on other (e.g., neighboring) frequencies for inter-frequency cell search. In some other embodiments, this information is provided per carrier frequency such that the same information applies to all cells on that carrier frequency. In yet another embodiment, this information is provided per PLMN such that the same information applies to all cells in that PLMN.

For example, the information in step 1000 may include information that indicates that, for a particular cell, UEs that support one or more particular UE RACH pre-compensation features (e.g., Features 2-A, 2-B, and 3) are permitted to select or reselect the cell. The information may additionally or alternatively indicate that, for this particular cell, UEs that support one or more particular features (e.g., Feature 1) or do not support one or more particular features (e.g., do not support Feature 2-A, 2-B, or 3) are not permitted to select that particular cell. In the same manner, the information may be specified per carrier or per PLMN.

At the UE, the UE obtains the information provided in step 1000 (step 1002). The UE decides whether the UE is permitted to select or reselect to a cell(s) (e.g., during cell search) based on the obtained information and the UE RACH pre-compensation feature(s) supported by the UE (step 1004). For example, if the information obtained in step 1002 is specified per cell, the UE may detect a particular cell during cell search and then decide whether the UE is permitted to select/reselect to that particular cell based on a comparison of the UE RACH pre-compensation feature(s) required to select/reselect to that particular cell and the UE RACH pre-compensation feature(s) supported by the UE. As another example, if the information obtained in step 1002 is specified per carrier, the UE may decide whether the UE is permitted to select to cells on a particular carrier based on a comparison of the UE RACH pre-compensation feature(s) required to select/reselect to cells on that particular carrier and the UE RACH pre-compensation feature(s) supported by the UE. If there is a match, the UE decides that it should perform a cell search on that particular carrier. If there is not a match, the UE decides that it should refrain from performing a cell search on that particular carrier. As another example, if the information obtained in step 1002 is specified per PLMN, the UE may decide whether the UE is permitted to select to cells on a particular PLMN based on a comparison of the UE RACH pre-compensation feature(s) required to select/reselect to cells on that particular PLMN and the UE RACH pre-compensation feature(s) supported by the UE. If there is a match, the UE decides that it should perform a cell search on that particular PLMN. If there is not a match, the UE decides that it should refrain from performing a cell search on that particular PLMN.

The UE then performs one or more actions in accordance with the decision of step 1004 (step 1006). For example, if the UE decides that it is permitted to select or reselect to a particular cell, the UE performs one or more actions associated with selecting or reselect to that particular cell. Conversely, if the UE decides that it is not permitted to select or reselect to a particular cell, the UE refrains from selecting or reselecting to that particular cell and, e.g., the UE performs one or more actions to select or reselect to a different cell.

Notably, as discussed above, in some other embodiments, the information provided in step 1000 is cell barring information, e.g., provided in system information. The UE uses this barring information to determine whether it is barred from accessing a particular cell and performs one or more actions in accordance with this determination. As discussed above, this cell barring information includes information that indicates that UEs are barred from certain types of actions in the cell (e.g., mobile originating signaling, mobile originating data, and/or the like). For example, an access class is defined for UEs with GNSS capability and/or an access class is defined for UEs without GNSS capability. If the network desires, it can bar the access from non-GNSS UEs in a cell to protect or prioritize preamble transmissions from GNSS-equipped UEs. As an example, consider the case where the network monitors statistics for preamble detection to obtain performance metrics such as missed detection rate and false alarm rate. In case of performance degradation, i.e., these metrics exceed certain predefined threshold, the network may disable access for non-GNSS UEs. As a result, if the performance degradation goes away, the network can identify the cause and attempt to improve the PRACH performance e.g., by allocating separate PRACH resources for GNSS and non-GNSS UEs. Notably, in the example above, the access class(es) are based on GNSS capability; however, the access class(es) may alternatively be based on RACH pre-compensation feature(s). Note, however, that GNSS capability is, in some embodiments, indicative of the RACH pre-compensation feature(s) supported by the UE.

Figure 11:
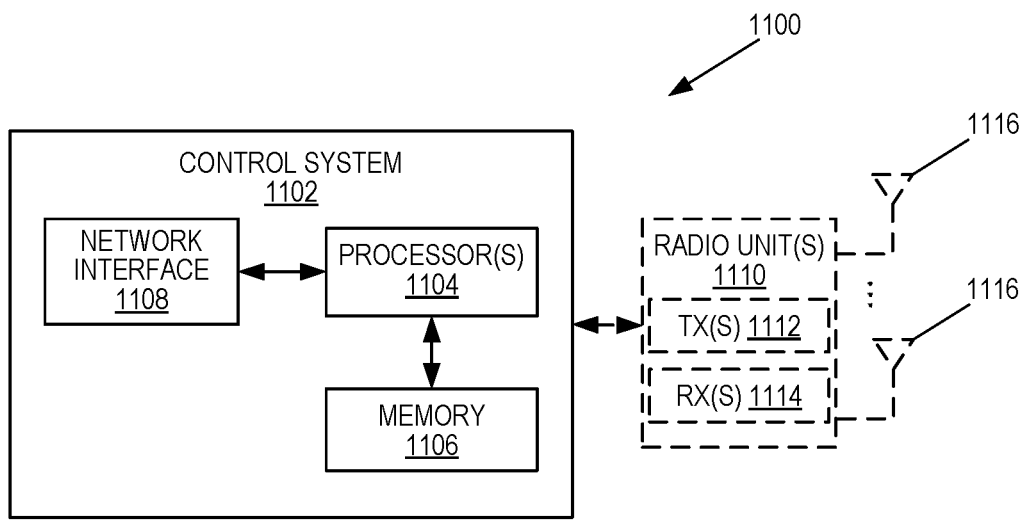
FIGS. 11 through 13 are schematic block diagrams of example embodiments of a network node in accordance with embodiments of the present disclosure.

FIG. 11 is a schematic block diagram of a network node 1100 according to some embodiments of the present disclosure. The network node 1100 may be, for example, the base station component 306 or a combination of the satellite 302 and the base station component 306. As illustrated, the network node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the network node 1100 may also include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a base station as described herein. In some embodiments, the function(s) are implemented in software that is stored, e.g., in the memory 1106 and executed by the one or more processors 1104.

Figure 12:
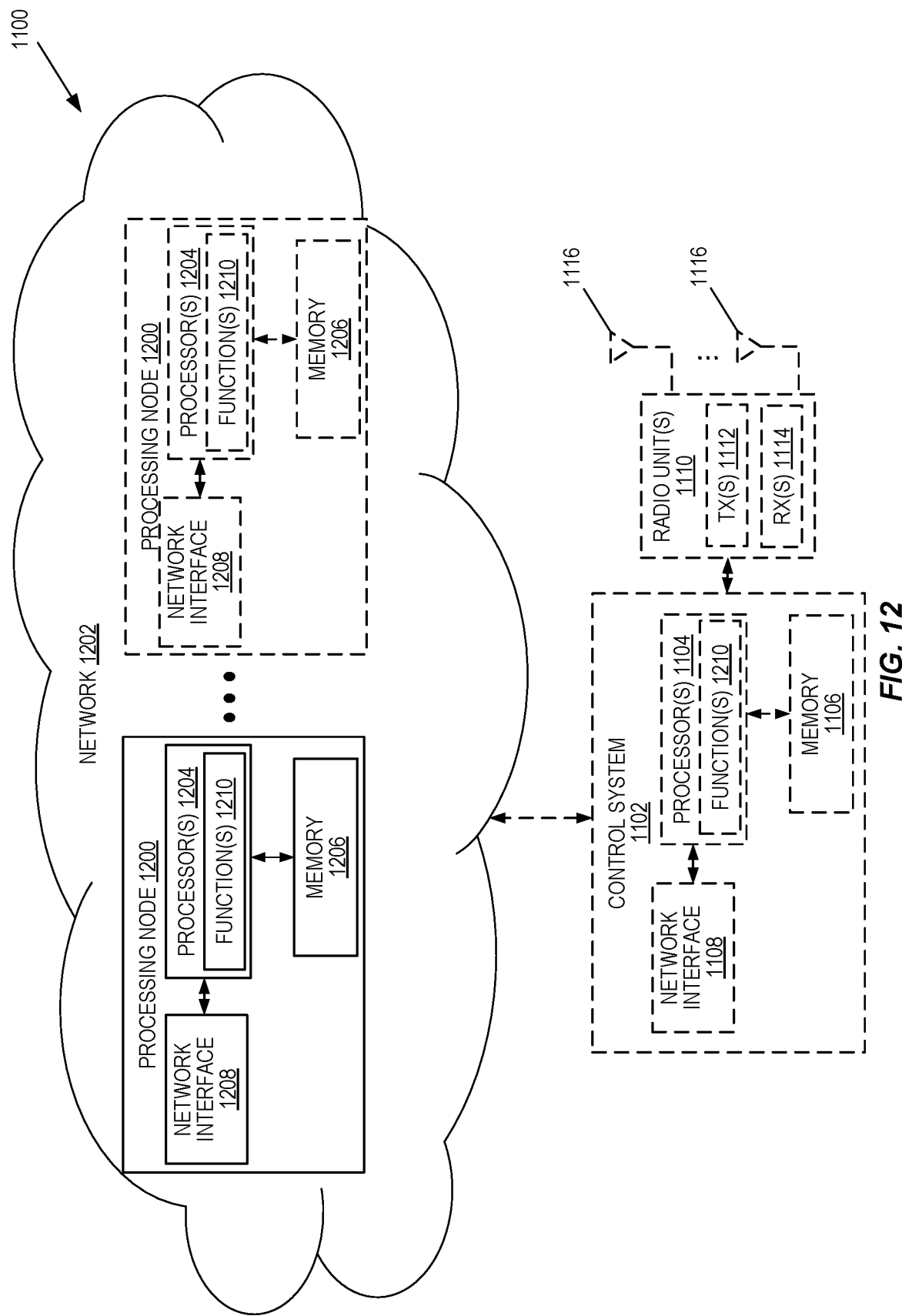

FIG. 12 is a schematic block diagram that illustrates a virtualized embodiment of the network node 1100 according to some embodiments of the present disclosure. As used herein, a "virtualized" network node is an implementation of the network node 1100 in which at least a portion of the functionality of the network node 1100 (e.g., at least some of the functionality of the base station described herein) is implemented as a virtual component(s) (e.g., via a virtual machine(s) executing on a physical processing node(s) in a network(s)). As illustrated, in this example, the network node 1100 includes one or more processing nodes 1200 coupled to or included as part of a network(s) 1202. Each processing node 1200 includes one or more processors 1204 (e.g., CPUs, ASICs, FPGAs, and/or the like), memory 1206, and a network interface 1208. In some embodiments, the network node 1100 may also include the control system 1102 and/or the one or more radio units 1110.

In this example, functions 1210 of the network node 1100 described herein (e.g., functions of the base station described herein) are implemented at the one or more processing nodes 1200 or distributed across the control system 1102 and the one or more processing nodes 1200 in any desired manner. In some particular embodiments, some or all of the functions 1210 of the network node 1100 described herein are implemented as virtual components executed by one or more virtual machines implemented in a virtual environment(s) hosted by the processing node(s) 1200. Notably, in some embodiments, the control system 1102 may not be included, in which case the radio unit(s) 1110 (if included) may communicate directly with the processing node(s) 1200 via an appropriate network interface(s).

In some embodiments, a computer program including instructions which, when executed by at least one processor, causes the at least one processor to carry out the functionality of network node 1100 or a node (e.g., a processing node 1200) implementing one or more of the functions 1210 of the network node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
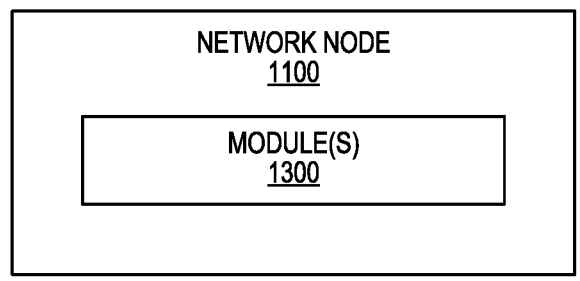

FIG. 13 is a schematic block diagram of the network node 1100 according to some other embodiments of the present disclosure. The network node 1100 includes one or more modules 1300, each of which is implemented in software. The module(s) 1300 provide the functionality of the network node 1100 described herein (e.g., the functionality of the base station described herein). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
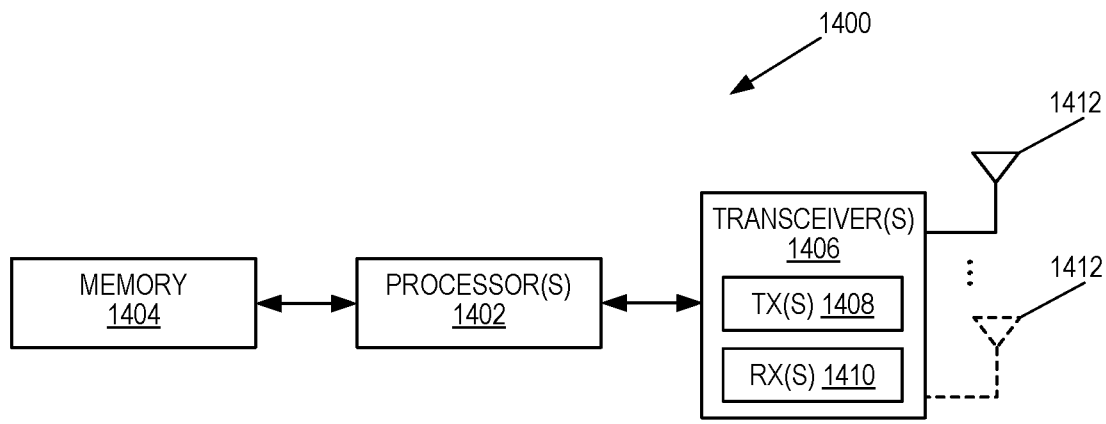
FIGS. 14 and 15 are schematic block diagrams of a UE in accordance with embodiments of the present disclosure.

FIG. 14 is a schematic block diagram of a UE 1400 (e.g., UE 308, UE 908, or UE 912) according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of a UE described above may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
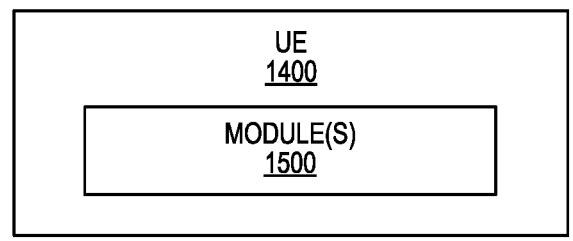

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device, the method comprising: obtaining (700) two or more Random Access Channel, RACH, configurations for two or more wireless device classes that support different levels of pre-compensation for RACH, have different Global Navigation Satellite System, GNSS, capabilities, or both; and selecting (702) a RACH configuration to be used by the wireless device from the two or more RACH configurations.

Embodiment 2: The method of embodiment 1 further comprising transmitting (704) a random access preamble in accordance with the selected RACH configuration.

Embodiment 3: The method of embodiment 1 or 2 wherein the two or more wireless device classes comprise one or more of the following wireless device classes: A first wireless device class that performs neither time compensation nor frequency compensation before starting initial access; a second wireless device class that performs time compensation, but not frequency compensation, before starting initial access; a third wireless device class that performs frequency compensation, but not time compensation, before starting initial access; and a fourth wireless device class that performs both time compensation and frequency compensation before starting initial access.

Embodiment 4: The method of embodiment 1 or 2 wherein the two or more wireless device classes comprise one or more of the following wireless device classes: a first wireless device class that has GNSS capability; and a second wireless device class that does not have GNSS capability.

Embodiment 5: The method of any one of embodiments 1 to 4 wherein the two or more RACH configurations indicate different RACH occasions.

Embodiment 6: The method of any one of embodiments 1 to 4 wherein the two or more RACH configurations indicate the same RACH occasions but comprise other configurations related to random access that are different (e.g., different Physical RACH, PRACH, preambles, different PRACH preamble sets, different amounts of random access attempts, and/or different random access related timers).

Embodiment 7: The method of any one of embodiments 1 to 6 wherein selecting (702) the RACH configuration to be used by the wireless device comprises selecting (702) the RACH configuration to be used by the wireless device from the two or more RACH configurations based on capabilities of the wireless device and one or more criteria.

Embodiment 8: A method performed by a wireless device, the method comprising: receiving (804), from a base station, a random access channel, RACH, configuration for a wireless device class of the wireless device, wherein the wireless device class of the wireless device is one of two or more wireless device classes that support different levels of pre-compensation for RACH, have different Global Navigation Satellite System, GNSS, capabilities, or both; and transmitting (806) a random access preamble in accordance with the received RACH configuration.

Embodiment 9: The method of embodiment 8 further comprising transmitting (800), to the base station, wireless device capability information comprising information that indicates the wireless device class of the wireless device or information from which the wireless device class of the wireless device can be derived.

Embodiment 10: The method of embodiment 8 or 9 wherein different RACH configurations are defined for the two or more wireless device classes.

Embodiment 11: The method of embodiment 10 wherein the different RACH configurations indicate different RACH occasions.

Embodiment 12: The method of embodiment 10 wherein the different RACH configurations indicate the same RACH occasions but comprise other configurations related to random access that are different (e.g., different Physical RACH, PRACH, preambles, different PRACH preamble sets, different amounts of random access attempts, and/or different random access related timers).

Embodiment 13: The method of any one of embodiments 8 to 12 wherein the two or more wireless device classes comprise one or more of the following wireless device classes: a first wireless device class that performs neither time compensation nor frequency compensation before starting initial access; a second wireless device class that performs time compensation, but not frequency compensation, before starting initial access; a third wireless device class that performs frequency compensation, but not time compensation, before starting initial access; and a fourth wireless device class that performs both time compensation and frequency compensation before starting initial access.

Embodiment 14: The method of embodiments 8 to 12 wherein the two or more wireless device classes comprise one or more of the following wireless device classes: a first wireless device class that has GNSS capability; and a second wireless device class that does not have GNSS capability.

Group B Embodiments

Embodiment 15: A method performed by a base station, the method comprising providing (700) (e.g., broadcasting) two or more random access channel, RACH, configurations for two or more wireless device classes that support different levels of pre-compensation for RACH, have different Global Navigation Satellite System, GNSS, capabilities, or both.

Embodiment 16: The method of embodiment 15 further comprising receiving (704) a random access preamble from a wireless device in accordance with a select RACH configuration from among the two or more RACH configurations.

Embodiment 17: The method of embodiment 16 further comprising determining a wireless device class of the wireless device based on the select RACH configuration used for the random access preamble.

Embodiment 18: The method of any one of embodiments 15 to 17 wherein the two or more wireless device classes comprise one or more of the following wireless device classes: a first wireless device class that performs neither time compensation nor frequency compensation before starting initial access; a second wireless device class that performs time compensation, but not frequency compensation, before starting initial access; a third wireless device class that performs frequency compensation, but not time compensation, before starting initial access; and a fourth wireless device class that performs both time compensation and frequency compensation before starting initial access.

Embodiment 19: The method of any one of embodiments 15 to 17 wherein the two or more wireless device classes comprise one or more of the following wireless device classes: a first wireless device class that has GNSS capability; and a second wireless device class that does not have GNSS capability.

Embodiment 20: The method of any one of embodiments 15 to 19 wherein the two or more RACH configurations indicate different RACH occasions.

Embodiment 21: The method of any one of embodiments 15 to 19 wherein the two or more RACH configurations indicate the same RACH occasions but comprise other configurations related to random access that are different (e.g., different Physical RACH, PRACH, preambles, different PRACH preamble sets, different amounts of random access attempts, and/or different random access related timers).

Embodiment 22: A method performed by a base station, the method comprising: selecting (802) a Random Access Channel, RACH, configuration to be used by a wireless device from among two or more RACH configurations for two or more wireless device classes that support different levels of pre-compensation for RACH, have different Global Navigation Satellite System, GNSS, capabilities, or both; and transmitting (804), to the wireless device, the selected RACH configuration for the wireless device.

Embodiment 23: The method of embodiment 22 further comprising receiving (806) a random access preamble in accordance with the selected RACH configuration.

Embodiment 24: The method of embodiment 22 or 23 further comprising: receiving (800), from the wireless device, wireless device capability information comprising information that indicates a wireless device class of the wireless device or information from which the wireless device class of the wireless device can be derived; wherein selecting (802) the RACH configuration to be used by the wireless device comprises selecting (802) the RACH configuration to be used by the wireless device based on the received wireless device capability information.

Embodiment 25: The method of any one of embodiments 22 to 24 wherein the two or more RACH configurations indicate different RACH occasions.

Embodiment 26: The method of any one of embodiments 22 to 24 wherein the two or more RACH configurations indicate the same RACH occasions but comprise other configurations related to random access that are different (e.g., different Physical RACH, PRACH, preambles, different PRACH preamble sets, different amounts of random access attempts, and/or different random access related timers).

Embodiment 27: The method of any one of embodiments 22 to 26 wherein the two or more wireless device classes comprise one or more of the following wireless device classes: a first wireless device class that performs neither time compensation nor frequency compensation before starting initial access; a second wireless device class that performs time compensation, but not frequency compensation, before starting initial access; a third wireless device class that performs frequency compensation, but not time compensation, before starting initial access; and a fourth wireless device class that performs both time compensation and frequency compensation before starting initial access.

Embodiment 28: The method of embodiments 22 to 26 wherein the two or more wireless device classes comprise one or more of the following wireless device classes: a first wireless device class that has GNSS capability; and a second wireless device class that does not have GNSS capability.

Embodiment 29: The method of embodiments 22 to 28 wherein selecting (702) the RACH configuration to be used by the wireless device comprises selecting (702) the RACH configuration to be used by the wireless device from the two or more RACH configurations based on capabilities of the wireless device and one or more criteria.

Group C Embodiments

Embodiment 30: A wireless device comprising: processing circuitry configured to perform any of the steps of any of the Group A and Group D embodiments; and power supply circuitry configured to supply power to the wireless device.

Embodiment 31: A base station comprising: processing circuitry configured to perform any of the steps of any of the Group B and Group E embodiments; and power supply circuitry configured to supply power to the base station.

Embodiment 32: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A and Group D embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Group D Embodiments

Embodiment 33: A method performed by a wireless device, the method comprising: obtaining (1002) information that indicates one or more random access channel pre-compensation features required for wireless devices to select one or more cells; making (1004) a decision as to whether the wireless device is permitted to select one or more cells based on the information and one or more random access channel pre-compensation features supported by the wireless device; and performing (1006) one or more actions in accordance with the decision.

Embodiment 34: The method of embodiment 33 wherein the information comprises, for each cell of one or more cells, information that indicates one or more random access channel pre-compensation features required for wireless devices to select the cell.

Embodiment 35: The method of embodiment 34 wherein the one or more cells comprise one or more neighbor cells of the wireless device.

Embodiment 36: The method of embodiment 34 wherein the one or more cells comprise one or more cells for intra-frequency cells search, one or more cells for inter-frequency cell search, or both one or more cells for intra-frequency cells search and one or more cells for inter-frequency cell search.

Embodiment 37: The method of any one of embodiments 34 to 36 wherein making (1004) the decision as to whether the wireless device is permitted to select one or more cells comprises making (1004) the decision as to whether the wireless device is permitted to select a particular cell based on the information that indicates the one or more random access channel pre-compensation features required for wireless devices to select the particular cell.

Embodiment 38: The method of embodiment 33 wherein the information comprises, for each carrier frequency of one or more carrier frequencies, information that indicates one or more random access channel pre-compensation features required for wireless devices to select cells on the carrier frequency.

Embodiment 39: The method of embodiment 38 wherein making (1004) the decision as to whether the wireless device is permitted to select one or more cells comprises making (1004) the decision as to whether the wireless device is permitted to select cells on a particular carrier frequency based on the information that indicates the one or more random access channel pre-compensation features required for wireless devices to select cells on the particular carrier frequency.

Embodiment 40: The method of embodiment 33 wherein the information comprises, for each PLMN of one or more PLMNs, information that indicates one or more random access channel pre-compensation features required for wireless devices to select cells in the PLMN.

Embodiment 41: The method of embodiment 40 wherein making (1004) the decision as to whether the wireless device is permitted to select one or more cells comprises making (1004) the decision as to whether the wireless device is permitted to select cells in a particular PLMN based on the information that indicates the one or more random access channel pre-compensation features required for wireless devices to select cells in the particular PLMN.

Embodiment 42: The method of any one of embodiments 33 to 41 wherein the information that indicates the one or more random access channel pre-compensation features required for wireless devices to select one or more cells comprises information that specifically indicates the one or more random access channel pre-compensation features.

Embodiment 43: The method of any one of embodiments 33 to 41 wherein the information that indicates the one or more random access channel pre-compensation features required for wireless devices to select one or more cells comprises information that indicates one or more wireless device classes, wherein each wireless device class of the one or more wireless device classes supports a different random access channel pre-compensation feature or a different set of random access channel pre-compensation features.

Embodiment 44: The method of any one of embodiments 33 to 43 wherein performing (1006) the one or more actions in accordance with the decision comprises: selecting or reselecting to one of the one or more cells for which the decision was made, if the decision is that the wireless device is permitted to select to the one or more cells; and refraining from selecting or reselecting to any one of the one or more cells for which the decision was made, if the decision is that the wireless device is not permitted to select to the one or more cells.

Group E Embodiments

Embodiment 45: A method performed by a base station, the method comprising: providing (1000), to one or more wireless devices, information that indicates one or more random access channel pre-compensation features required for wireless devices to select one or more cells.

Embodiment 46: The method of embodiment 45 wherein the information comprises, for each cell of one or more cells, information that indicates one or more random access channel pre-compensation features required for wireless devices to select the cell.

Embodiment 47: The method of embodiment 46 wherein the one or more cells comprise one or more neighbor cells of the wireless device.

Embodiment 48: The method of embodiment 46 wherein the one or more cells comprise one or more cells for intra-frequency cells search, one or more cells for inter-frequency cell search, or both one or more cells for intra-frequency cells search and one or more cells for inter-frequency cell search.

Embodiment 49: The method of embodiment 45 wherein the information comprises, for each carrier frequency of one or more carrier frequencies, information that indicates one or more random access channel pre-compensation features required for wireless devices to select cells on the carrier frequency.

Embodiment 50: The method of embodiment 45 wherein the information comprises, for each PLMN of one or more PLMNs, information that indicates one or more random access channel pre-compensation features required for wireless devices to select cells in the PLMN.

Embodiment 51: The method of any one of embodiments 45 to 50 wherein the information that indicates the one or more random access channel pre-compensation features required for wireless devices to select one or more cells comprises information that specifically indicates the one or more random access channel pre-compensation features.

Embodiment 52: The method of any one of embodiments 45 to 50 wherein the information that indicates the one or more random access channel pre-compensation features required for wireless devices to select one or more cells comprises information that indicates one or more wireless device classes, wherein each wireless device class of the one or more wireless device classes supports a different random access channel pre-compensation feature or a different set of random access channel pre-compensation features.

Embodiment 53: The method of any one of embodiments 45 to 52 wherein providing (1000) the information comprises broadcasting the information as part of system information.

Embodiment 86: The method of any one of embodiments 45 to 52 wherein providing (1000) the information comprises signaling the information to the one or more wireless devices.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| 5GC | Fifth Generation Core Network |
| 5GS | Fifth Generation System |
| AP | Access Point |
| ASIC | Application Specific Integrated Circuit |
| CPU | Central Processing Unit |
| DSP | Digital Signal Processor |
| eMBB | Enhanced Mobile Broadband |
| EPC | Evolved Packet Core |
| EPS | Evolved Packet System |
| FPGA | Field Programmable Gate Array |
| GEO | Geostationary Orbit |
| gNB | New Radio Base Station |
| GNSS | Global Navigation Satellite System |
| km | Kilometer |
| LEO | Low Earth Orbit |
| LTE | Long Term Evolution |
| LTE-M | Long Term Evolution Machine Type Communication |
| MBB | Mobile Broadband |
| MEO | Medium Earth Orbit |
| mMTC | Massive Machine Type Communications |
| NB-IoT | Narrowband Internet of Things |
| NR | New Radio |
| NTN | Non-Terrestrial Network |
| OTT | Over-the-Top |
| PRACH | Physical Random Access Channel |
| RACH | Random Access Channel |
| RAM | Random Access Memory |
| RAN | Radio Access Network |
| ROM | Read Only Memory |
| RSRP | Reference Signal Received Power |
| RSRQ | Reference Signal Received Quality |
| RTT | Round Trip Time |
| TA | Timing Advance |
| TR | Technical Report |
| TS | Technical Specification |
| UE | User Equipment |
| URLLC | Ultra-Reliable and Low Latency Communication |

Those skilled in the art will recognize improvements and modifications to the embodiments of the present disclosure. All such improvements and modifications are considered within the scope of the concepts disclosed herein.

What is claimed is:

1. A method performed by a wireless device, the method comprising:
    obtaining two or more random access configurations for two or more respective wireless device classes that support different combinations of capabilities of the wireless device, wherein the capabilities comprise time compensation ability and frequency compensation ability for random access and Global Navigation Satellite System, GNSS, capabilities; and selecting a random access configuration to be used by the wireless device from the two or more random access configurations based on the capabilities of the wireless device as well as on one or more criteria comprising a radio quality link or an uncertainty parameter of the time compensation ability being below a predefined threshold or the frequency compensation ability.

2. The method of claim 1 further comprising transmitting a random access preamble in accordance with the selected random access configuration.

3. The method of claim 1 wherein the two or more wireless device classes comprise:
   a first wireless device class that performs neither time compensation nor frequency compensation before starting initial access;
   a second wireless device class that performs time compensation, but not frequency compensation, before starting initial access;
   a third wireless device class that performs frequency compensation, but not time compensation, before starting initial access;
   a fourth wireless device class that performs both time compensation and frequency compensation before starting initial access; or
   any combination of two or more of the first, second, third, or fourth wireless device classes.

4. The method of claim 1 wherein the two or more wireless device classes comprise one or more of the following wireless device classes:
   a first wireless device class that has GNSS capability; and
   a second wireless device class that does not have GNSS capability.

5. The method of claim 1 wherein the two or more random access configurations indicate different Random Access Channel, RACH, occasions.

6. The method of claim 1 wherein the two or more random access configurations indicate same RACH occasions but comprise other configurations related to random access that are different.

7. The method of claim 6 wherein the other configurations related to random access comprise:
   a) different random access preambles for the two or more random access configurations;
   b) different random access preamble sets for the two or more random access configurations;
   c) different amounts of random access attempts for the two or more random access configurations;
   d) different random access related timers for the two or more random access configurations; or
   e) any combination of two or more of (a)-(d).

8. The method of claim 1 wherein selecting the random access configuration to be used by the wireless device comprises selecting the random access configuration to be used by the wireless device from the two or more random access configurations based on capabilities of the wireless device.

9. The method of claim 1 wherein selecting the random access configuration to be used by the wireless device comprises selecting the random access configuration to be used by the wireless device from the two or more random access configurations based on the capabilities of the wireless device and the one or more criteria, the one or more criteria also comprising a round trip time between the wireless device and a base station.

10. A wireless device comprising:
    one or more transmitters;
    one or more receivers; and
    processing circuitry associated with the one or more transmitters and the one or more receivers, the processing circuitry configured to cause the wireless device to:
        obtain two or more random access configurations for two or more wireless device classes that support different combinations of capabilities of the wireless device, wherein the capabilities comprise time compensation ability and frequency compensation ability for random access and Global Navigation Satellite System, GNSS, capabilities; and
        select a random access configuration to be used by the wireless device from the two or more random access configurations based on the capabilities of the wireless device as well as on one or more criteria comprising a radio quality link or an uncertainty parameter of the time compensation ability being below a predefined threshold or the frequency compensation ability.

11. A method performed by a wireless device, the method comprising:
    receiving, from a base station, a random access configuration for a wireless device class of the wireless device, wherein the wireless device class of the wireless device is one of two or more wireless device classes that support different combinations of capabilities of the wireless device, wherein the capabilities comprise time compensation ability and frequency compensation ability for random access and Global Navigation Satellite System, GNSS, capabilities; and
    transmitting a random access preamble in accordance with the received random access configuration, wherein the random access configuration is based on the capabilities of the wireless device as well as on one or more criteria comprising a radio quality link or an uncertainty parameter of the time compensation ability being below a predefined threshold or the frequency compensation ability.

12. The method of claim 11 further comprising transmitting, to the base station, wireless device capability information comprising information that indicates the wireless device class of the wireless device or information from which the wireless device class of the wireless device can be derived.

13. The method of claim 11 wherein different random access configurations are defined for the two or more wireless device classes.

14. The method of claim 13 wherein the different random access configurations indicate different RACH occasions.

15. The method of claim 13 wherein the different random access configurations indicate same RACH occasions but comprise other configurations related to random access that are different.

16. The method of claim 15 wherein the other configurations related to random access comprise:
    a) different random access preambles for two or more random access configurations;
    b) different random access preamble sets for the two or more random access configurations;
    c) different amounts of random access attempts for the two or more random access configurations;
    d) different random access related timers for the two or more random access configurations; or
    e) any combination of two or more of (a)-(d).

17. The method of claim 11 wherein the two or more wireless device classes comprise:
- a first wireless device class that performs neither time compensation nor frequency compensation before starting initial access;
- a second wireless device class that performs time compensation, but not frequency compensation, before starting initial access;
- a third wireless device class that performs frequency compensation, but not time compensation, before starting initial access;
- a fourth wireless device class that performs both time compensation and frequency compensation before starting initial access; or
- any combination of two or more of the first, second, third, or fourth wireless device classes.

18. The method of claim 11 wherein the two or more wireless device classes comprise one or more of the following wireless device classes:
- a first wireless device class that has GNSS capability; and
- a second wireless device class that does not have GNSS capability.

19. The method of claim 11 wherein the random access configuration received from the base station is a random access configuration to be used by the wireless device when performing a random access towards a cell served by the base station.

20. The method of claim 11 wherein receiving the random access configuration comprises receiving the random access configuration in a handover command.

21. The method of claim 20 wherein transmitting the random access preamble in accordance with the received random access configuration comprises transmitting the random access preamble in accordance with the received random access configuration towards a target cell for a handover.

22. A wireless device comprising:
- one or more transmitters;
- one or more receivers; and
- processing circuitry associated with the one or more transmitters and the one or more receivers, the processing circuitry configured to cause the wireless device to:
  - receive, from a base station, a random access configuration for a wireless device class of the wireless device, wherein the wireless device class of the wireless device is one of two or more wireless device classes that support different combinations of capabilities of the wireless device, wherein the capabilities comprise time compensation ability and frequency compensation ability for random access and Global Navigation Satellite System, GNSS, capabilities; and
  - transmit a random access preamble in accordance with the received random access configuration, wherein the random access configuration is based on the capabilities of the wireless device as well as on one or more criteria comprising a radio quality link or an uncertainty parameter of the time compensation ability being below a predefined threshold or the frequency compensation ability.

23. A method performed by a base station, the method comprising:
- providing, to one or more wireless devices, two or more random access configurations for two or more wireless device classes that support different combinations of capabilities of the wireless device, wherein the capabilities comprise time compensation ability and frequency compensation ability for random access and Global Navigation Satellite System, GNSS, capabilities, wherein the random access configurations are based on the capabilities of the wireless device as well as on one or more criteria comprising a radio quality link or an uncertainty parameter of the time compensation ability being below a predefined threshold or the frequency compensation ability.

24. A method performed by a base station, the method comprising:
- selecting a random access configuration to be used by a wireless device from among two or more random access configurations for two or more wireless device classes that support different combinations of capabilities of the wireless device, wherein the capabilities comprise time compensation ability and frequency compensation ability for random access and Global Navigation Satellite System, GNSS, capabilities; and
- transmitting, to the wireless device, the selected random access configuration for the wireless device, wherein the random access configuration is based on the capabilities of the wireless device as well as on one or more criteria comprising a radio quality link or an uncertainty parameter of the time compensation ability being below a predefined threshold or the frequency compensation ability.

* * * * *